United States Patent
Kitani

(10) Patent No.: US 8,135,782 B2
(45) Date of Patent: Mar. 13, 2012

(54) ELECTRONIC APPARATUS, PRESENCE COMMUNICATION SYSTEM, AND COMPUTER-READABLE RECORDING MEDIUM

(75) Inventor: Mitsuhiro Kitani, Kanagawa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1100 days.

(21) Appl. No.: 11/986,260

(22) Filed: Nov. 20, 2007

(65) Prior Publication Data

US 2008/0117019 A1 May 22, 2008

(30) Foreign Application Priority Data

Nov. 22, 2006 (JP) .................................. 2006-315481
Nov. 19, 2007 (JP) .................................. 2007-299802

(51) Int. Cl.
*G06F 15/16* (2006.01)
(52) U.S. Cl. ........................................................ 709/206
(58) Field of Classification Search .................. 709/206, 709/227
See application file for complete search history.

(56) References Cited

U.S. PATENT DOCUMENTS

| | | | | |
|---|---|---|---|---|
| 7,103,806 | B1* | 9/2006 | Horvitz | 714/43 |
| 7,525,941 | B2* | 4/2009 | Islam et al. | 370/335 |
| 7,716,532 | B2* | 5/2010 | Horvitz | 714/43 |
| 2004/0039920 | A1* | 2/2004 | Kim et al. | 713/185 |
| 2006/0101116 | A1* | 5/2006 | Rittman et al. | 709/204 |
| 2006/0149818 | A1* | 7/2006 | Odell et al. | 709/206 |
| 2006/0212518 | A1* | 9/2006 | Bailey et al. | 709/205 |
| 2006/0240798 | A1* | 10/2006 | Jarosinski et al. | 455/343.1 |
| 2007/0026893 | A1* | 2/2007 | Sakamoto et al. | 455/558 |
| 2007/0124386 | A1* | 5/2007 | Klassen | 709/206 |
| 2007/0141985 | A1* | 6/2007 | Parkkinen et al. | 455/41.2 |
| 2007/0291729 | A1* | 12/2007 | Dalsgaard et al. | 370/347 |
| 2008/0008140 | A1* | 1/2008 | Forssell | 370/338 |
| 2008/0031225 | A1* | 2/2008 | Chavda et al. | 370/352 |
| 2008/0061940 | A1* | 3/2008 | Onderko et al. | 340/10.1 |

FOREIGN PATENT DOCUMENTS

| | | |
|---|---|---|
| JP | 09-084094 | 3/1997 |
| JP | 09-205686 | 8/1997 |
| JP | 09-224288 | 8/1997 |
| JP | 2002-199426 | 7/2002 |
| JP | 2005-080199 | 3/2005 |
| JP | 2005-136553 | 5/2005 |

\* cited by examiner

*Primary Examiner* — Wing Chan
*Assistant Examiner* — Alicia Baturay
(74) *Attorney, Agent, or Firm* — Cozen O'Connor

(57) ABSTRACT

An electronic apparatus comprises a plurality of communication units including a first communication unit which communicates via a first communication network and a second communication unit which communicates via a second communication network. The electronic apparatus acquires presence information indicating a communication state of a communication apparatus from a presence server managing a communication state of a communication apparatus on a communication network, via at least one communication network. The electronic apparatus acquires presence information of an alternative communication apparatus being as a communication apparatus which communicates via the second communication network in place of the second communication unit included in itself. The electronic apparatus determines as to whether the alternate communication apparatus is in an online state, based on the acquired presence information. The electronic apparatus suppresses electric power to be consumed by the second communication unit, when the alternate communication apparatus is in an online state.

13 Claims, 13 Drawing Sheets

| ELECTRONIC APPARATUS ~AI | PRESENCE ~PR | OWNER ~UI |
| --- | --- | --- |
| MOBIL COMM TERMINAL 1 __FIRST WIRELESS COMM UNIT 131 | ONLINE | Taro TSUSHIN |
| MOBILE COMM TERMINAL 1 __SECOND WIRELESS COMM UNIT 132 | ONLINE | Taro TSUSHIN |
| MOBILE COMM TERMINAL 2 | ONLINE | Taro TSUSHIN |
| NOTEBOOK PC__COMPANY | OFFLINE | Taro TSUSHIN |
| PC__HOME | ONLINE | Taro TSUSHIN |
| PC__COMPANY | ONLINE (GETTING OUT OF SEAT) | Taro TSUSHIN |
| PDA | OFFLINE | Taro TSUSHIN |
| NAVIGATION SYSTEM__CAR | OFFLINE | Taro TSUSHIN |
| TV | OFFLINE | Taro TSUSHIN |
| MOBILE COMM TERMINAL 3__CDMA | CONNECT STATE | Hanako MUSEN |
| MOBILE COMM TERMINAL 4__CDMA | OFFLINE | Ichiro KEITAI |

FIG. 3A

| MONITORING TARGET ~AI | OWNER ~UI |
| --- | --- |
| MOBILE COMM TERMINAL 2 | Taro TSUSHIN |
| NOTEBOOK PC__COMPANY | Taro TSUSHIN |
| PC__HOME | Taro TSUSHIN |
| PC__COMPANY | Taro TSUSHIN |
| PDA | Taro TSUSHIN |
| NAVIGATION SYSTEM__CAR | Taro TSUSHIN |
| TV | Taro TSUSHIN |

FIG. 3B

| ELECTRONIC APPARATUS | OWNER | FORWARDING DESTINATION | |
| --- | --- | --- | --- |
| | | VOICE | DATA |
| MOBILE COMM TERMINAL 1 SECOND WIRELESS COMM UNIT 132 | Taro TSUSHIN | MOBILE COMM TERMINAL 2 | MOBILE COMM TERMINAL 2 |
| NOTEBOOK PC_COMPANY | Taro TSUSHIN | NOTEBOOK PC_COMPANY | PC_HOME |
| PC_HOME | Taro TSUSHIN | PC_HOME | PC_HOME |
| PC_COMPANY | Taro TSUSHIN | PC_COMPANY | PC_HOME |
| PDA | Taro TSUSHIN | PDA | PDA |
| NAVIGATION SYSTEM_CAR | Taro TSUSHIN | NAVIGATION SYSTEM_CAR | NAVIGATION SYSTEM_CAR |
| TV | Taro TSUSHIN | TV | TV |

FIG. 3C

ELECTRONIC APPARATUS, PRESENCE COMMUNICATION SYSTEM, AND COMPUTER-READABLE RECORDING MEDIUM

BACKGROUND OF THE INVENTION

1. Field of the Invention

The present invention relates to an electronic apparatus comprising a plurality of communication units.

2. Description of the Related Art

Unexamined Japanese Patent Application KOKAI Publication No. 2002-199426 discloses a mobile terminal which is communicable via a plurality of communication systems.

Specifically, the mobile terminal is provided with a plurality of wireless communication units which are communicable via a plurality of communication systems. Depending on communication quality given for each of the communication systems, the mobile terminal switches a communication system for the use.

The above-mentioned mobile terminal is provided with a plurality of wireless communication units, all of which are supplied with electric power on a steady basis. Being compared with a mobile terminal including only one wireless communication unit, therefore, the mobile terminal is provided with increased consumption electric power.

An electronic apparatus, such as a mobile terminal, employs a battery as a power source which supplies electric power for use in an operation in many cases. In case of such an electronic apparatus, thus, operable time is significantly reduced by the battery.

SUMMARY OF THE INVENTION

The present invention has been made, in consideration of the above-mentioned situation. The object of the present invention is, in case of an electronic apparatus having a plurality of communication units, to provide an electronic apparatus or the like which can suppress electric power consumption.

In order to achieve the above-mentioned object, an electronic apparatus according to a first aspect of the present invention relates to an electronic apparatus which communicates via a plurality of communication networks including a first communication network and a second communication network being different from the first communication network, and comprises:

a plurality of communication units including a first communication unit which communicates via the first communication network and a second communication unit which communicates via the second communication network;

a presence information acquiring unit which acquires presence information indicating a communication state of an alternate communication apparatus being as a communication apparatus which communicates via the second communication network in place of the second communication unit;

an online determining unit which determines as to whether the alternate communication apparatus is in an online state, based on the presence information acquired by the presence information acquiring unit; and a consumed electric power controlling unit which suppresses electric power to be consumed by the second communication unit, when the online determining unit determines that the alternate communication apparatus is in an online state.

Furthermore, a presence communication system according to a second aspect of the present invention comprises:

a presence server which manages a communication state of a communication apparatus; and an electronic apparatus which communicates via a plurality of communication networks including a first communication network and a second communication network being different from the first communication network, wherein the presence server transmits presence information indicating a communication state of an alternate communication apparatus being as a communication apparatus which communicates via the second communication network in place of the second communication unit, to the electronic apparatus, and the electronic apparatus further comprises:

a plurality of communication units including a first communication unit which communicates via the first communication network and a second communication unit which communicates via the second communication network;

a presence information acquiring unit which acquires presence information of the alternate communication apparatus transmitted by the presence server, via at least one of a plurality of the communication networks;

an online determining unit which determines as to whether the alternate communication apparatus is in an online state, based on the presence information acquired by the presence information acquiring unit; and a consumed electric power controlling unit which suppresses electric power to be consumed by the second communication unit, when the online determining unit determines that the alternate communication apparatus is in an online state.

Furthermore, a computer-readable recording medium according to a third aspect of the present invention stores a program which causes a computer, comprising a plurality of communication units including a first communication unit which communicates via a first communication network and a second communication unit which communicates via a second communication network being different from the first communication network and, communicating via a plurality of communication networks including the first communication network and the second communication network, to execute:

a present presence information acquiring step of acquiring presence information indicating a communication state of an alternate communication apparatus being as a communication apparatus which communicates via the second communication network in place of the second communication unit;

an online determining step of determining as to whether the alternate communication apparatus is in an online state, based on the presence information acquired in the presence information acquiring step; and a consumed electric power controlling step which suppresses electric power to be consumed by the second communication unit, when it is determined that the alternate communication apparatus is in an online state in the online determining step.

According to the present invention, electric power consumption can be suppressed by an electronic apparatus including a plurality of communication units.

BRIEF DESCRIPTION OF THE DRAWINGS

These objects and other objects and advantages of the present invention will become more apparent upon reading of the following detailed description and the accompanying drawings in which:

FIG. 3A represents a diagram indicating presence information, FIG. 3B represents a diagram indicating presence monitoring target information, and FIG. 3C represents a diagram indicating forwarding information;

DETAILED DESCRIPTION OF THE PREFERRED EMBODIMENTS

Embodiment 1

Figure 1:
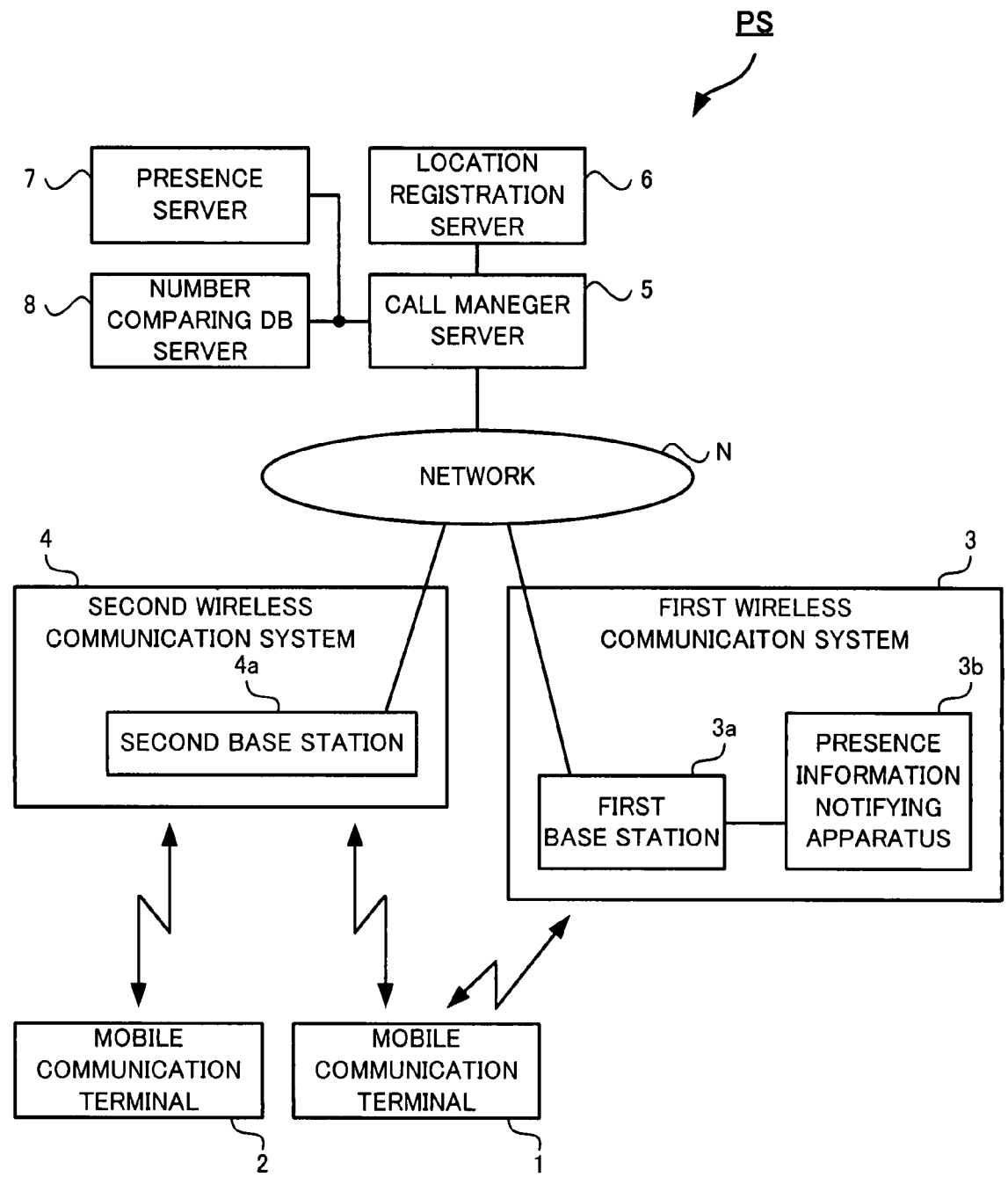
FIG. 1 represents a block diagram illustrating the whole configuration of a presence communication system according to embodiment 1 of the present invention.

Hereinafter, embodiment 1 of the present invention is explained with reference to diagrams.

Embodiment 1 employs a mobile communication terminal 1 and a mobile communication terminal 2, each of which being as a communication apparatus, as an electronic apparatus.

First of all, the whole configuration of a presence communication system PS according to embodiment 1 is explained with reference to FIG. 1.

The presence communication system PS comprises a mobile communication terminal 1, a mobile communication terminal 2, a first wireless communication system 3, a second wireless communication system 4, a call manager server 5, a location registration server 6, a presence server 7, a number comparing DB (Database) server 8, and a network N. The first wireless communication system 3 includes a first base station 3a and a presence information notifying apparatus 3b. The second wireless communication system 4 includes a second base station 4a.

The mobile communication terminal 1, the mobile communication terminal 2, the first base station 3a, the presence information notifying apparatus 3b, the second base station 4a, the call manager server 5, the location registration server 6, the presence server 7, the number comparing DB server 8 reciprocally transmit data via the network N.

The mobile communication terminal 1, which is provided with a plurality of wireless communication units, represents an electronic apparatus according to embodiment 1. The mobile communication terminal 1 receives audio (voice) signals or data signals via the first wireless communication system 3 and the second wireless communication system 4, with the use of a plurality of the wireless communication units. Furthermore, the mobile communication terminal 1 is communicable in accordance with an SIP (Session Initiation Protocol).

The details concerning the circuit configuration of the mobile communication terminal 1 are to be hereinafter described.

The mobile communication terminal 2 represents an electronic apparatus being provided with one wireless communication unit, which is not shown in the figure. The mobile communication terminal 2 receives audio signals or data signals via the second wireless communication system 4, with the wireless communication unit. Further, the mobile communication terminal 2 is communicable in accordance with an SIP. Furthermore, the mobile communication terminal 1 and the mobile communication terminal 2 share the same owner.

The first wireless communication system 3 represents a wide-area wireless communication network, which includes the first base station 3a and the presence information notifying apparatus 3b. The first wireless communication system 3, for example, represents a portable communication system with the use of a cellular method, such as a CDMA (Code Division Multiple Access).

The first base station 3a relays communication among a plurality of electronic apparatuses, which is via the first wireless communication system 3.

The presence information notifying apparatus 3b notifies presence information transmitted from a presence server 7, which is to be hereinafter described, to the mobile communication terminal 1, while the mobile communication terminal 1 communicating via the first wireless communication system 3 is in a discontinuous idle state which indicates that a traffic channel is disconnected in an idle state.

The second wireless communication system 4 represents a local wireless communication network, which is provided with the second base station 4a. The second wireless communication system 4, for example, represents a wireless LAN (Local Area Network) communication system, such as an IEEE (the Institute of Electrical and Electronic Engineers) 802.11b standard.

The second base station 4a relays communication among a plurality of electronic apparatuses, which is via the second wireless communication system 4.

The call manager server 5 represents a server for use of a call manager which processes a message generated in accordance with an SIP.

The location registration server 6 stores information which relates an apparatus identifier such as a phone number being imparted to an electronic apparatus, to location information such as an IP address.

The presence server 7 represents a server apparatus which manages an operational state (including a communication state) of an electronic apparatus on a communication network. The presence server 7 stores presence information indicating the operational state for each electronic apparatus, and transmits presence information concerning other electronic apparatuses, to an electronic apparatus which communicates with the use of a presence communication system PS. Furthermore, an electronic apparatus on a communication network within the presence communication system PS transmits presence information indicating a post-variation operational state, when an operational state of a wireless communication unit included in itself is varied, to the presence server 7.

Here, presence information specifically represents information indicating a communication state found in a wireless communication unit of an electronic apparatus for use of communication by a phone, an electronic mail, or the like, and a user state of the electronic apparatus. Presence information represents, for example, "on line" which indicates an electronic apparatus being with a communicable state, "connect state" which indicates an electronic apparatus being with a communicating state, "online (getting out of the seat)" which indicates an electronic apparatus being with a communicable state, but a user getting out of the seat, "offline" which indicates an electronic apparatus being with a incommunicable state, and others.

As being illustrated in FIG. 3A, presence information relates an apparatus identifier AI specifying an electronic apparatus (a phone number, an IP address, a unique title being imparted by a user with a determination for each electronic apparatus, and others), a presence PR indicating a communication state found in a wireless communication unit of an electronic apparatus and a user state of the electronic apparatus, a user identifier UI indicating a user of an electronic apparatus (owner), to one another.

The number comparing DB server 8 stores forwarding information for forwarding a reception into any electronic apparatus to other electronic apparatuses. The number comparing DB server 8 is compared by a call manager server 5, when a reception is forwarded.

At this point, as being illustrated in FIG. 3C, the forwarding information represents information reciprocally relating a forwarding source electronic apparatus to a forwarding destination electronic apparatus among a plurality of electronic apparatuses owned by a user, by an apparatus identifier being imparted at each electronic apparatus. When a reception into the second wireless communication unit 132 provided at the mobile communication terminal 1 is intended to be forwarded to the mobile communication terminal 2 owned by a user, by way of example, a user of the mobile communication terminal 1 registers "mobile communication terminal 1_second wireless communication unit 132" as a forwarding source in the number comparing DB server 8 and "mobile communication terminal 2" as a forwarding destination, by relating to one another. In case of such forwarding information being stored in the number comparing DB server 8, the mobile communication terminal 2 being as a forwarding destination receives in place of the second wireless communication unit 132 provided at the mobile communication terminal 1 being as a forwarding source and communicates with an electronic apparatus being as a transmitter, when any electronic apparatuses transmit to the second wireless communication unit 132 provided at the mobile communication terminal 1.

Next, the mobile communication terminal 1 according to embodiment 1 is to be explained.

Figure 2:
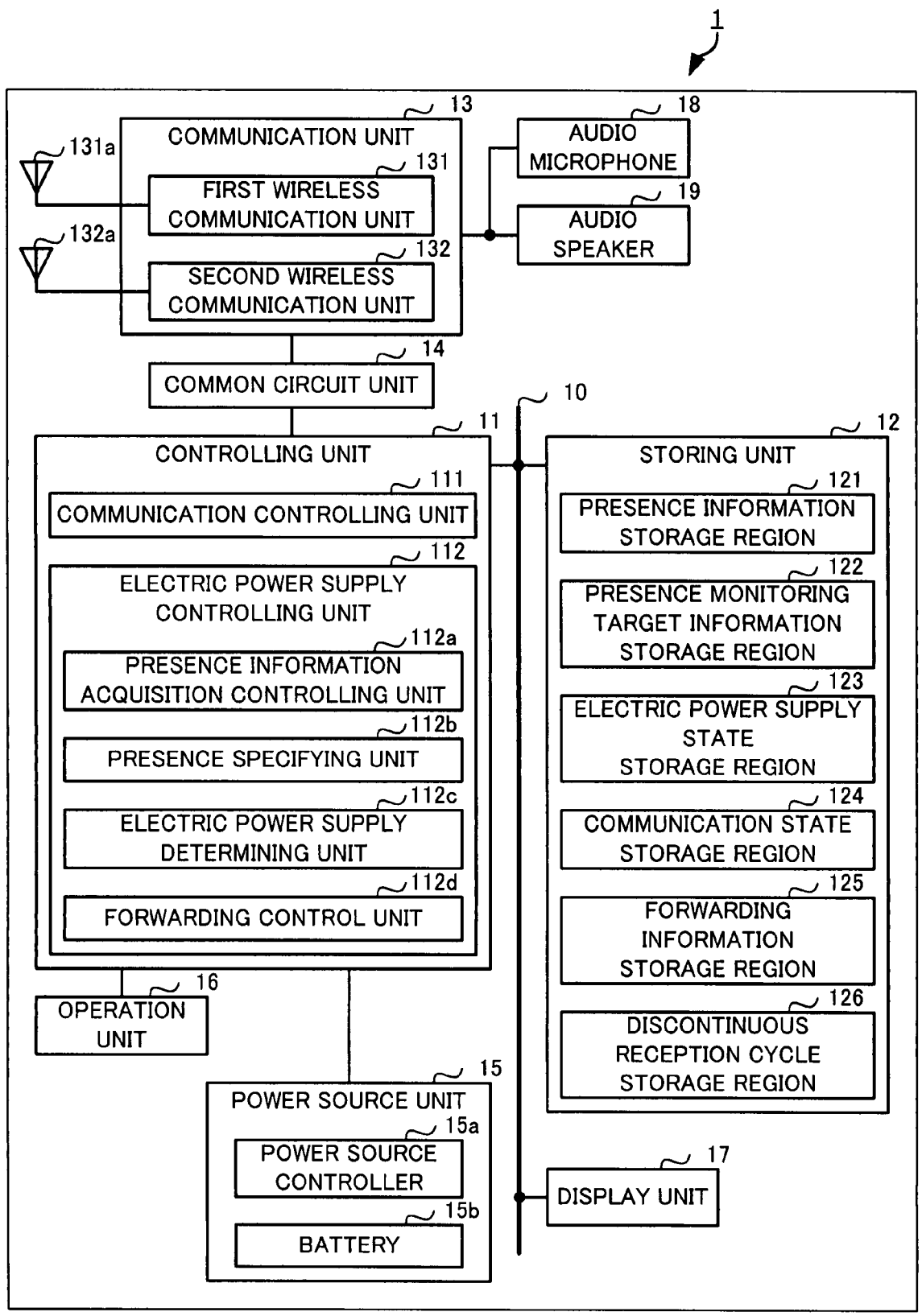
FIG. 2 represents a block diagram illustrating a circuit configuration of a mobile communication terminal according to embodiment 1 of the present invention.

As being illustrated in FIG. 2, the mobile communication terminal 1 is provided with a controlling unit 11, a storing unit 12, a communication unit 13, a common circuit unit 14, a power source unit 15, an operation unit 16, a display unit 17, an audio microphone 18, an audio speaker 19, and a bus 10.

The controlling unit 11 is provided with a CPU (Central Processing Unit) and controls an operation as a whole given by the mobile communication terminal 1, in accordance with an operation program stored in the storing unit 12.

Furthermore, the controlling unit 11 is provided with a communication controlling unit 111 and an electric power supply controlling unit 112.

The communication controlling unit 111 controls the wireless communication units, by giving an instruction to change an operation state concerning a communication function to a first wireless communication unit 131 and a second wireless communication unit 132 both of which provided at the communication unit 13. The communication controlling unit 111 controls the first wireless communication unit 131 and the second wireless communication unit 132 both of which as being an operation state such as a transmission, a reception, a reception queuing (idle state) of a wireless signal and others, by way of example.

Furthermore, a time slot TS is defined in an awaiting wireless signal. Information to be received is also included for each time cycle adopted for the time slot TS.

The communication controlling unit 111 supplies electric power into the first wireless communication unit 131 and into the second wireless communication unit 132 for reducing electric power consumption of a battery 15b provided at the power source unit 15 by coupling with a timing given by the time slot TS, but terminates power supply at other timings.

The electric power supply controlling unit 112 receives presence information concerning all the electronic apparatuses to be used by a user from the communication controlling unit 111 and controls an operation state concerning the power source unit 15 in response to the presence information.

Furthermore, the electric power supply controlling unit 112 is provided with a presence information acquisition controlling unit 112a, a presence specifying unit 112b, an electric power supply determining unit 112c, and a forwarding control unit 112d. The details concerning each constituent element provided at the electric power supply controlling unit 112 are to be hereinafter described.

The storing unit 12 is comprised of a nonvolatile memory such as a flash memory and an RAM (Random Access Memory) and stores a program and others for causing the controlling unit 11 to execute a process as being indicated in the flowcharts given in FIGS. 4A to 4C, FIGS. 5A to 5C, and FIG. 6. Furthermore, the storing unit 12 functions as a working memory provided for the controlling unit 11.

Furthermore, the storing unit 12 is provided with a presence information storage region 121, a presence monitoring target information storage region 122, an electric power supply state storage region 123, a communication state storage region 124, a forwarding information storage region 125, and a discontinuous reception cycle storage region 126.

The presence information storage region 121 stores presence information received from the presence server 7, as being indicated in FIG. 3A.

Among presence information, an apparatus identifier AI for specifying an electronic apparatus registers the first wireless communication unit 131 and the second wireless communication unit 132 both of which are provided at the mobile communication terminal 1. In this way, in case of one electronic apparatus having a plurality of communication units, an apparatus identifier AI is assigned for each communication unit.

Furthermore, a presence PR given by an electronic apparatus includes "online," "offline," and "connect state" and is established by information combining an electric power supply state and a communication state both of which concerning an electronic apparatus. Furthermore, a user identifier UI identifies "Mr. Taro TSUSHIN" as an owner of the mobile communication terminal 1.

The presence monitoring target information storage region 122 stores presence monitoring target information as being illustrated in FIG. 3B. The presence monitoring target information represents a list concerning electronic apparatuses which can be intended for monitoring presence information and also represents information input by a user from an operation unit 16. Among electronic apparatuses owned by a user, an electronic apparatus (alternate electronic apparatus) which are communicable via the second wireless communication system 4 in place of the second wireless communication unit 132 is specifically registered to presence monitoring target information as a monitoring target (target for monitoring).

As being illustrated in FIG. 3B, presence monitoring target information represents information relating an apparatus identifier AI indicating an electronic apparatus being as a target for monitoring presence, to a user identifier UI indicating an owner of an electronic apparatus. In FIG. 3B, for example, the mobile communication terminal 2, a PDA (Personal Digital Assistants) and others are registered. However, a user identifier UI needs not to necessarily be registered. Furthermore, FIG. 1 illustrates the mobile communication terminal 2 as an example representing an electronic apparatus intended for monitoring. However, an electronic apparatus intended for monitoring simply needs to be an electronic apparatus which is communicable via the second wireless communication system 4 as being listed in FIG. 3B, and may register one part as well as a plurality of parts.

When the mobile communication terminal 1 receives presence information from the presence server 7, the presence monitoring target information is compared by the presence specifying unit 112b for determining as to whether an electronic apparatus having the received presence information is a target for monitoring.

The electric power supply state storage region 123 stores electric power supply information indicating an electric power supply state of a plurality of wireless communication units provided at the communication unit 13.

The electric power supply state represents "online" when electric power is supplied into a wireless communication unit provided at the communication unit 13, but represents "offline" when electric power is not supplied into a wireless communication unit provided at the communication unit 13.

The communication state storage region 124 receives and stores communication state information indicating an operation state concerning a communication function caused by a plurality of wireless communication units provided at the communication unit 13, from the communication controlling unit 111.

Communication state information, for example, represents "idle state (standby state)", "connect state (communicating state)", "access state", "wireless communication unit switching state", and others.

A presence PR indicating an operation state found in the mobile communication terminal 1 is comprised of combining electric power supply information and communication state information. Furthermore, a presence PR such as "online (forwarding data included)" may be provided. In case of providing such a presence PR, a user can easily grasp as to whether forwarding data is included at an electronic apparatus provided as a forwarding destination for data.

The forwarding information storage region 125 stores information concerning a forwarding destination which relates a receiving electronic apparatus to an electronic apparatus being a forwarding destination for the reception.

As being illustrated in FIG. 3C, information concerning a forwarding destination relates an apparatus identifier AI indicating a receiving electronic apparatus to a forwarding destination identifier TI indicating an electronic apparatus being as a forwarding destination for the reception.

Furthermore, information concerning a forwarding destination is changeable by an input from the operation unit 16 by a user.

An forwarding destination identifier TI includes a first forwarding destination identifier TI 1 which indicates a first forwarding destination to which a reception of a voice signal is forwarded and a second forwarding destination identifier TI 2 which indicates a second forwarding destination to which a reception of a data signal is forwarded.

In this way, in case of an example shown in FIG. 3C illustrating information concerning a forwarding destination, a voice signal being transmitted to a notebook PC for use in a company is received by the notebook PC as it is, and a data signal being transmitted to the notebook PC is forwarded to a PC found at home for a user.

The discontinuous reception cycle storage region 126 stores a "discontinuous reception cycle" which indicates a timing that the battery 15b supplies electric power into the first wireless communication unit 131 and into the second wireless communication unit 132 in an idle state, in order to cause a communication function provided at the first wireless communication unit 131 and at the second wireless communication unit 132 to enter in the idle state.

The discontinuous reception cycle storage region 126 found in embodiment 1 stores a predetermined discontinuous reception cycle T1. The discontinuous reception cycle T1 is compared while the first wireless communication unit 131 and the second wireless communication unit 132 are normally awaiting reception in an idle state. Thus, a T1 is hereinafter referred to as a "normal discontinuous reception cycle."

The communication unit 13 is provided with the first wireless communication unit 131 and the second wireless communication unit 132.

The first wireless communication unit 131 represents a wide-area wireless communication unit which communicates via the first wireless communication system 3. The second wireless communication unit 132 represents a local wireless communication unit which communicates via the second wireless communication system 4. Furthermore, a wireless communication unit provided at the mobile communication terminal 2 represents a local wireless communication unit which communicates via the second wireless communication system 4, as in the second wireless communication unit 132.

The first wireless communication unit 131 communicates with the first base station 3a via an antenna 131a, and transmits/receives an audio signal, a video signal and a data signal. For example, the first wireless communication unit 131 receives, demodulates, and outputs a signal defining presence information, from the presence server 7.

The second wireless communication unit 132 communicates with the second base station 4a via an antenna 132a, and transmits/receives an audio signal, a video signal and a data signal. For example, the second wireless communication unit 132 receives, demodulates, and outputs a signal defining presence information, from the presence server 7.

The mobile communication terminal 1 is communicable with other electronic apparatuses via the first wireless communication system 3 being as a wide-area wireless communication system, with the use of the first wireless communication unit 131. Furthermore, the mobile communication terminal 1 is communicable with other electronic apparatuses via the second wireless communication system 4 being as a local wireless communication system, with the use of the second wireless communication unit 132.

This allows the mobile communication terminal 1 to include wide-area connectivity characterizing a wide-area wireless communication system as well as inexpensive and high-speed data communicability characterizing a local wireless communication system.

Furthermore, the common circuit unit 14 represents a circuit which performs a process to a wireless signal, which is common to the first wireless communication unit 131 and the second wireless communication unit 132.

The power source unit 15 is provided with a power source controller 15a and a battery 15b.

The power source controller 15a supplies electric power for use of an operation into the first wireless communication unit 131 and into the second wireless communication unit 132, in accordance with a control instruction given by the electric power supply controlling unit 112.

Furthermore, the power source controller 15a supplies electric power into each constituent element within the mobile communication terminal 1 in accordance with an instruction given by the electric power supply controlling unit 112, when the power of the mobile communication terminal 1 is in an "ON" state, but supplies electric power for use of awaiting power ON operation into the controlling unit 11 and into the operation unit 16, when the power is in an "OFF" state.

The operation unit 16 is provided with various keys and buttons all of which are for use in inputting an instruction and data by a user. The various instructions and data are input the operation unit 16 and sent to the controlling unit 11. Furthermore, the operation unit 16 is provided with power button which turn the power of the mobile communication terminal 1 to an "ON" state or to an "OFF" state.

A user may, for example, give input when imparting a unique title to an electronic apparatus, and give an instruction concerning turning the power of the mobile communication terminal 1 to an "ON" state or to an "OFF" state, or the like, by operating the operation unit 16.

The display unit 17 is comprised of an LCD (Liquid Crystal Display) panel with a dot matrix type and a driver circuit, and displays any images.

The audio microphone 18 collects audio signals while calling or the like, to be supplied into the communication unit 13.

The audio speaker 19 outputs demodulated audio signals while calling or the like.

The bus 10 reciprocally transmits data among the controlling unit 11, the storing unit 12, and the display unit 17.

Next, the details concerning each constituent element provided at the electric power supply controlling unit 112 are to be explained.

The presence information acquisition controlling unit 112a acquires presence information received from the presence server 7 by the communication unit 13, which is indicated in FIG. 3A, and causes the presence information storage region 121 to store. This allows a user to confirm a communication state found in a wireless communication unit provided at an electronic apparatus on a communication network within a presence communication system PS, when the presence information is visualized. Furthermore, the mobile communication terminal 1 may receive only presence information found in an electronic apparatus in which a presence PR is modified by the presence server 7. In such a case, the presence information acquisition controlling unit 112a needs to rewrite a modified portion only within the presence information which is previously stored in the presence information storage region 121, based on the received presence information.

Furthermore, the presence information acquisition controlling unit 112a notifies the presence specifying unit 112b that presence information is received, when the presence information is received.

The presence specifying unit 112b determines as to whether an electronic apparatus indicating the communication state by the presence information represents an electronic apparatus as a monitoring target, with reference to presence information stored in the presence information storage region 121 which is found in FIG. 3A, with presence monitoring target information stored in the presence monitoring target information storage region 122 which is found in FIG. 3B.

The electric power supply determining unit 112c determines as to whether electric power supply into the first wireless communication unit 131 or into the second wireless communication unit 132 is to be continued or to be terminated, based on the presence PR concerning an electronic apparatus which is determined as being a monitoring target by the presence specifying unit 112b, on electric power supply information concerning the communication unit 13 stored in the electric power supply state storage region 123, and on communication state information concerning the communication unit 13 stored in the communication state storage region 124.

Furthermore, the electric power supply determining unit 112c instructs the power source controller 15a to control electric power supply into the first wireless communication unit 131 and into the second wireless communication unit 132 both of which are from the battery 15b, in accordance with the determined result.

The forwarding controlling unit 112d requests the call manager server 5 to forward a reception into the mobile communication terminal 1 to other electronic apparatuses, in accordance with forwarding information.

Figure 4A:
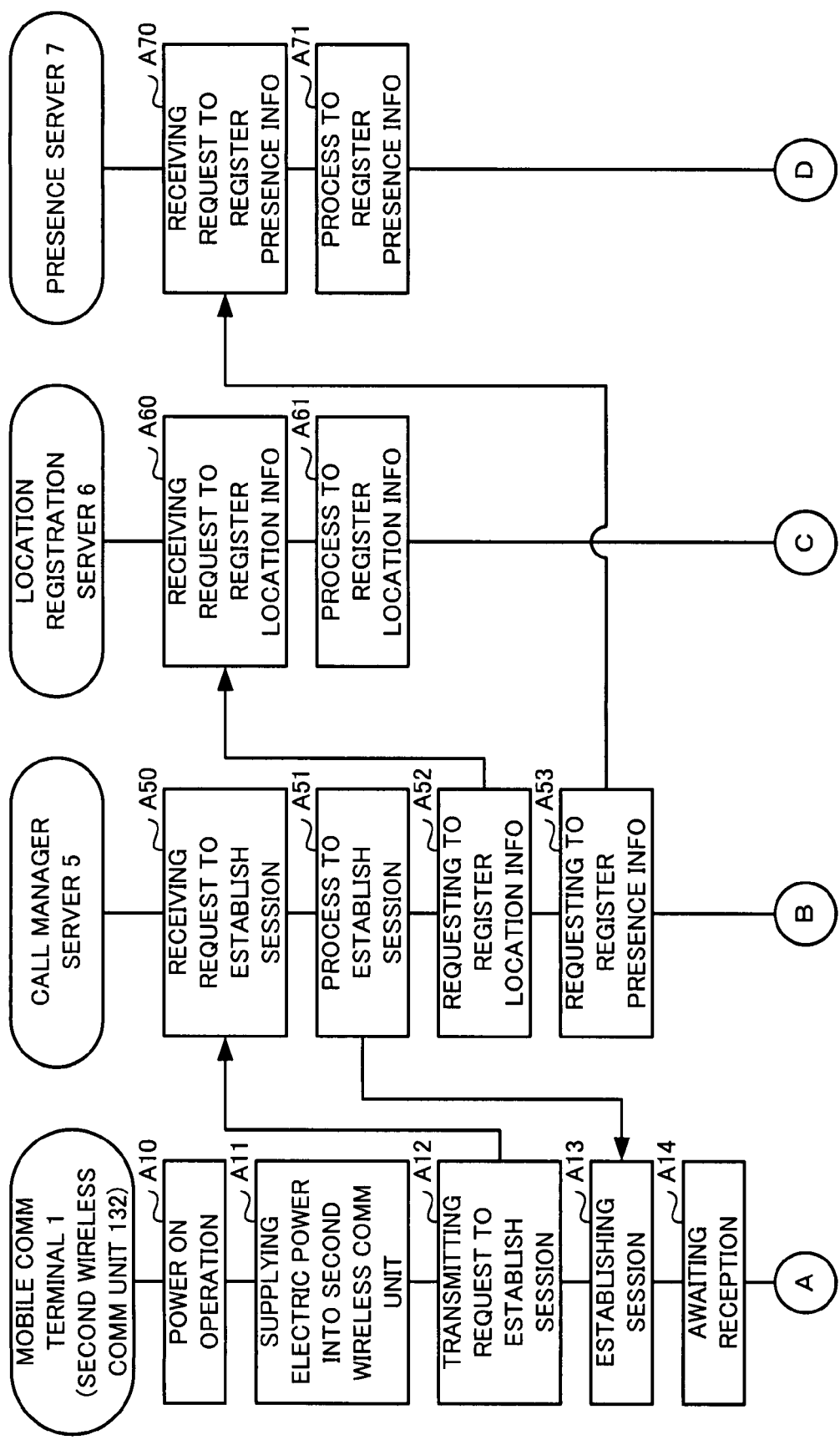
FIGS. 4A, 4B, and 4C represent flowcharts indicating an operation related to each element constituting a presence communication system, when a mobile communication terminal turns a second wireless communication unit from an on-state into an off-state, in embodiment 1 of the present invention.
Figure 4B:
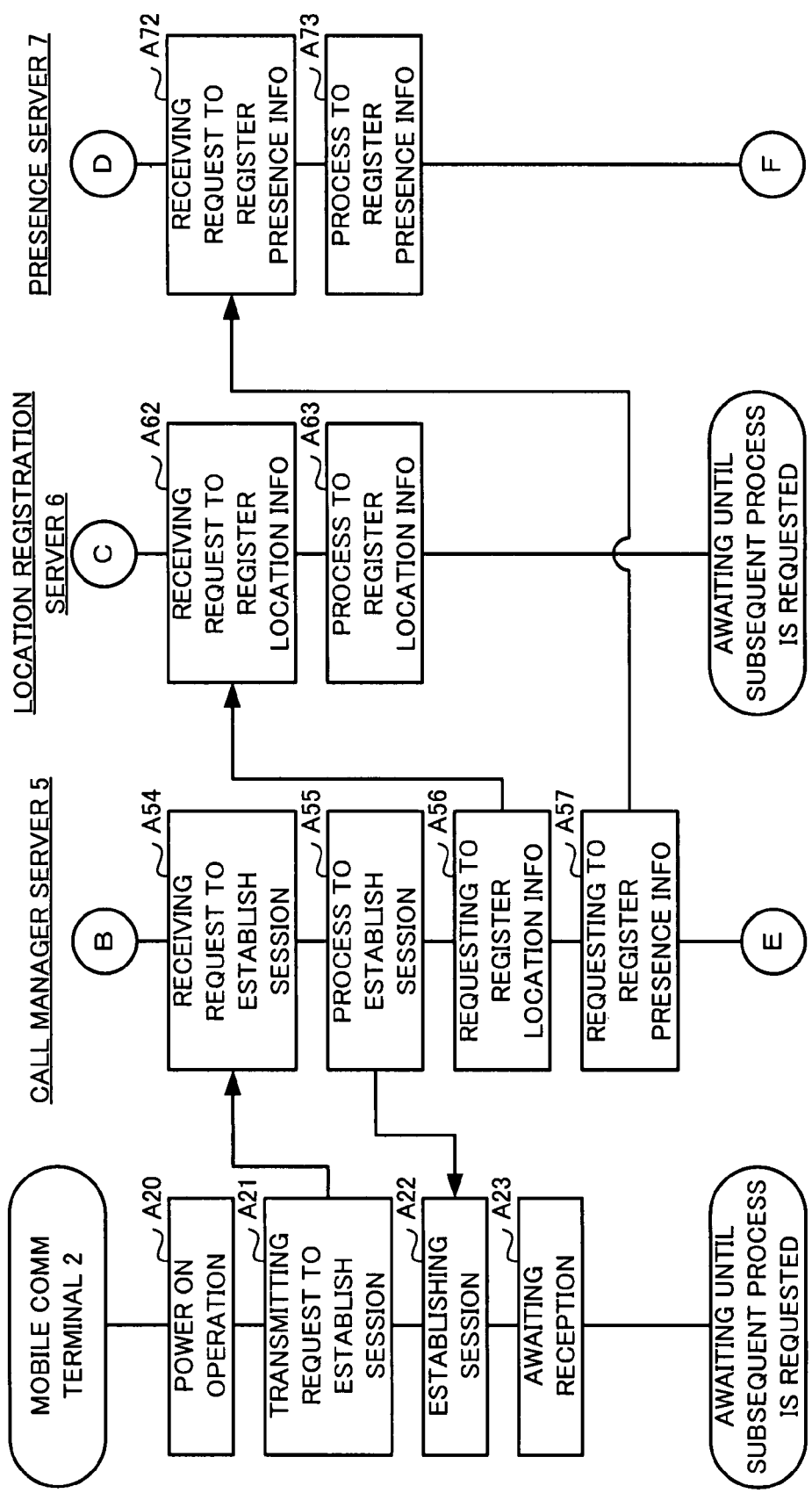
Figure 4C:
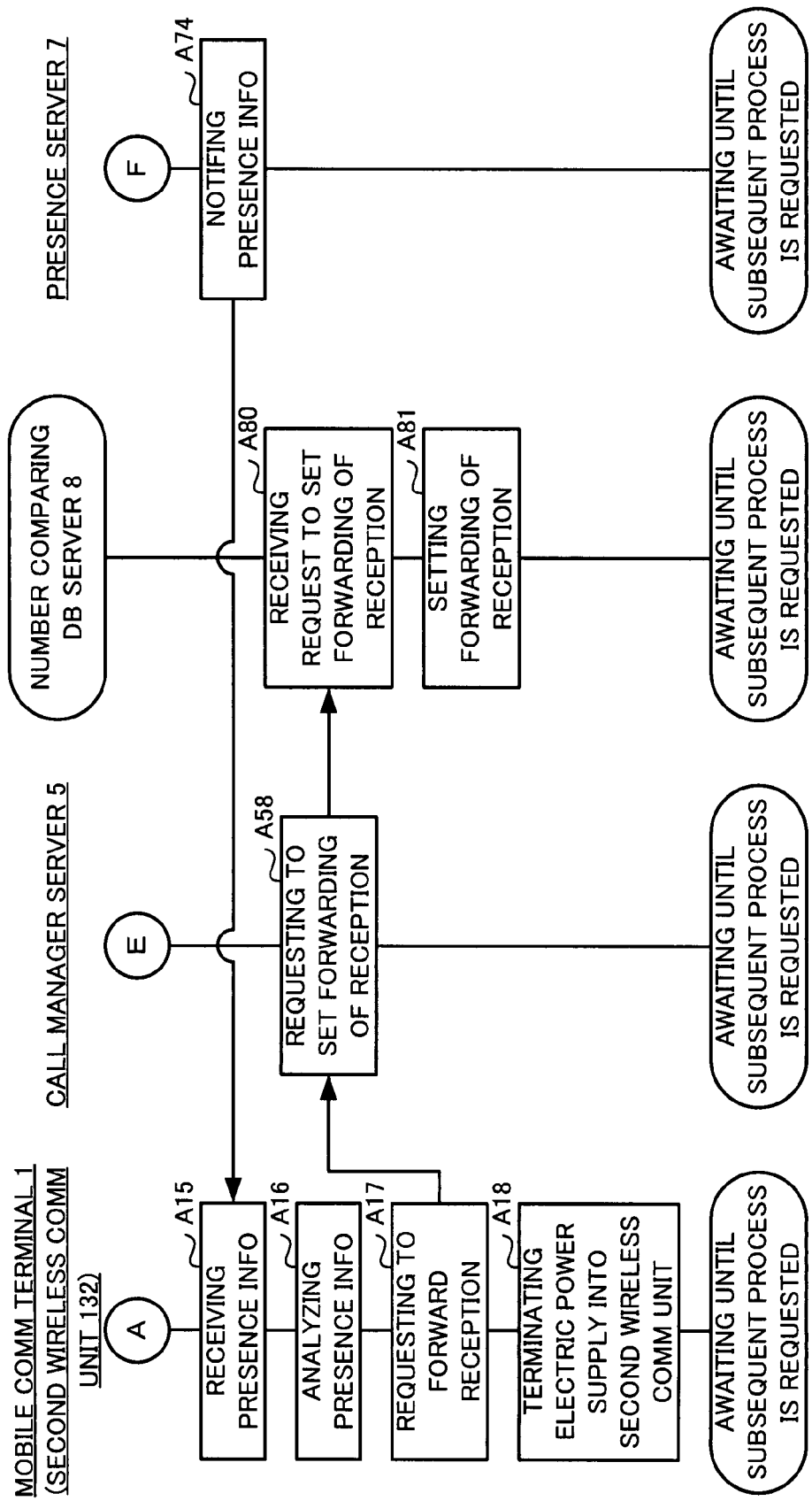

Next, with reference to the flowcharts found in FIGS. 4A to 4C, the details concerning an operation of each constituent element provided at the presence communication system PS, when the mobile communication terminal 1 controls the state of the second wireless communication unit 132 from "ON" to "OFF" in order to suppress electric power consumption of the battery 15b, are to be explained.

Furthermore, that both the first wireless communication unit 131 and the second wireless communication unit 132 are supplied with electric power and are activated with an online state when the power of the mobile communication terminal 1 is turned into an "ON" state, is assumed.

The processes illustrated in flowcharts found in FIGS. 4A to 4C are initiated, when a user performs a power ON operation provided for the mobile communication terminal 1, by pressing a power button provided at the mobile communication terminal 1. Furthermore, an explanation mainly concerning an operation related to the second wireless communication unit 132 among operations provided for the mobile communication terminal 1 is to be given in FIGS. 4A to 4C.

When a user performs a power ON operation (step A10 found in FIG. 4A), the electric power supply controlling unit 112 supplies electric power for use in an operation into the second wireless communication unit 132 (step A11). Furthermore, the electric power supply controlling unit 112 supplies electric power for use in an operation into the first wireless communication unit 131 in a similar manner.

The second wireless communication unit 132 transmits a request to establish a session to the call manager server 5 via the second base station 4a (step A12). The call manager server 5 receives the request to establish a session (step A50) and executes a process to establish a session (step A51). This allows a session to be established in between the second wireless communication unit 132 and the call manager server 5 (step A13).

Furthermore, the second wireless communication unit 132 requests the location registration server 6 to register location information via the call manager server 5, when a request to establish a session is transmitted. As a result of this process, the call manager server 5 requests the location registration server 6 to register location information concerning the second wireless communication unit 132 provided at the mobile communication terminal 1 (step A52). The location registration server 6 receives a request to register location information (step A60) and executes a process to register location information (step A61).

Furthermore, the second wireless communication unit 132 requests the presence server 7 to register presence information via the call manager server 5, when a request to establish a session is transmitted. As a result of this process, the call manager server 5 requests the presence server 7 to register presence information concerning the second wireless communication unit 132 provided at the mobile communication terminal 1 (step A53).

The presence server 7 receives a request to register presence information (step A70) and executes a process to register presence information (step A71). The presence server 7 recognizes that the second wireless communication unit 132 provided at the mobile communication terminal 1 is in an online (valid) state, by a request from the call manager server 5 in step A53.

The second wireless communication unit 132 requests to register location information and presence information, and subsequently awaits a reception of a wireless signal from other electronic apparatuses (step A14). As in the second wireless communication unit 133, the first wireless communication unit 131 also establishes a session with the call manager server 5. Location information and presence information, both of which concerning the first wireless communication unit 131, are subsequently registered in the location registration server 6 and in the presence server 7.

Once the second wireless communication unit 132 is transited into an idle state, that a user has performed a power ON operation provided for the mobile communication terminal 2 is assumed. With a power ON operation performed by a user (step A20 found in FIG. 4B), a wireless communication unit provided at the mobile communication terminal 2 is supplied with electric power for use in an operation.

At the moment, the mobile communication terminal 2 (wireless communication unit provided at the mobile communication terminal 2) transmits a request to establish a session to the call manager server 5 via the second base station 4a (step A21). The call manager server 5 receives a request to establish a session (step A54), and executes a process to establish a session (step A55). This allows a session to be established in between the mobile communication terminal 2 and the call manager server 5 (step A22).

Furthermore, the mobile communication terminal 2 requests the location registration server 6 to register location information via the call manager server 5 when a request to establish a session is transmitted, and requests the presence server 7 to register presence information. In order to perform this process, the call manager server 5 requests the location registration server 6 to register location information concerning the mobile communication terminal 2 (step A56), and requests the presence server 7 to register presence information concerning the mobile communication terminal 2 (step A57). With a request from the call manager server 5 found in step A57, the presence server 7 recognizes that a wireless communication unit provided at the mobile communication terminal 2 is in an online (valid) state.

Once a session is established, the mobile communication terminal 2 is transited into an idle state (step A23), and awaits until the subsequent process is requested.

The location registration server 6 receives a request to register location information (step A62), and executes a process to register the location information (step A63).

The presence server 7 receives a request to register presence information (step A72), and executes a process to register the presence information (step A73).

The presence server 7 notifies the mobile communication terminal 1 of registered presence information of the mobile communication terminal 2, which is presence information indicating that the mobile communication terminal 2 is transited into an online state, via the second wireless communication system 4 (step A74 found in FIG. 4C).

Here, the presence server 7 notifies the mobile communication terminal 1 of presence information via the "second wireless communication system 4" because of recognition that the second wireless communication unit 132, which communicates via the second wireless communication system 4, is in an online (valid) state by a process found in step A53. Further, in case of recognition that the first wireless communication unit 131 is in an online (valid) state, the presence server 7 may notify the mobile communication terminal 1 of the presence information via the first wireless communication system 3.

The second wireless communication unit 132 receives presence information indicating that the mobile communication terminal 2 which is registered in the presence monitoring target information is in an online state (step A15).

The mobile communication terminal 1 analyzes received presence information (step A16). As a result of the analysis, the mobile communication terminal 1 recognizes that the mobile communication terminal 2 which communicates via the second wireless communication system 4, as in the second wireless communication unit 132, is in an online state. The mobile communication terminal 1 consequently executes processes found in steps A17 and A18 both of which are utilized for turning the power of the second wireless communication unit 132 into an OFF state.

First of all, the mobile communication terminal 1 requests the call manager server 5 to forward a reception, in order to cause the mobile communication terminal 2 being in an online state to receive data transmitted from other electronic apparatuses to the second wireless communication unit 132 (step A17). At the moment, the mobile communication terminal 1 may request to forward a reception with the use of one of the first wireless communication unit 131 and the second wireless communication unit 132.

The call manager server 5 requests the number comparing DB server 8 to set forwarding of reception, in accordance with a request from the mobile communication terminal 1 (step A58). The number comparing DB server 8 receives a request to set forwarding of reception (step A80), and sets forwarding of reception (step A81). The call manager server 5 refers to set information with the number comparing DB server 8, when executing forwarding of reception.

Once a forwarding control unit 112d provided at the mobile communication terminal 1 requests the call manager server 5 to forward a reception, the electric power supply controlling unit 112 terminates electric power supply into the second wireless communication unit 132 (step A18).

This causes the second wireless communication unit 132 to be in a power OFF state, until electric power is subsequently supplied.

The details concerning processes found in steps A16 to A18 are to be hereinafter explained with reference to the flowchart found in FIG. 6.

In case of a transmitting electronic apparatus having a function to call successively after confirmation regarding a presence PR of a receiving electronic apparatus, a transmitting user is required to call by choosing an electronic apparatus being in an online state among provided electronic apparatuses by a communication partner. Therefore, processes found in steps A17, A58, A80, and A81 which are employed for forwarding of reception need not necessarily to be performed. Furthermore, in such a case, the mobile communication terminal 1 may not be provided with a forwarding information storage region 125 and a forwarding control unit 112d.

However, in case of a mobile communication terminal 1 including a forwarding information storage region 125 and a forwarding control unit 112d, a reception is forwarded to other electronic apparatuses even though a communicating electronic apparatus is in an offline state. Accordingly, a transmitting user may call without adverting to a presence PR found in a communicating electronic apparatus.

Figure 5A:
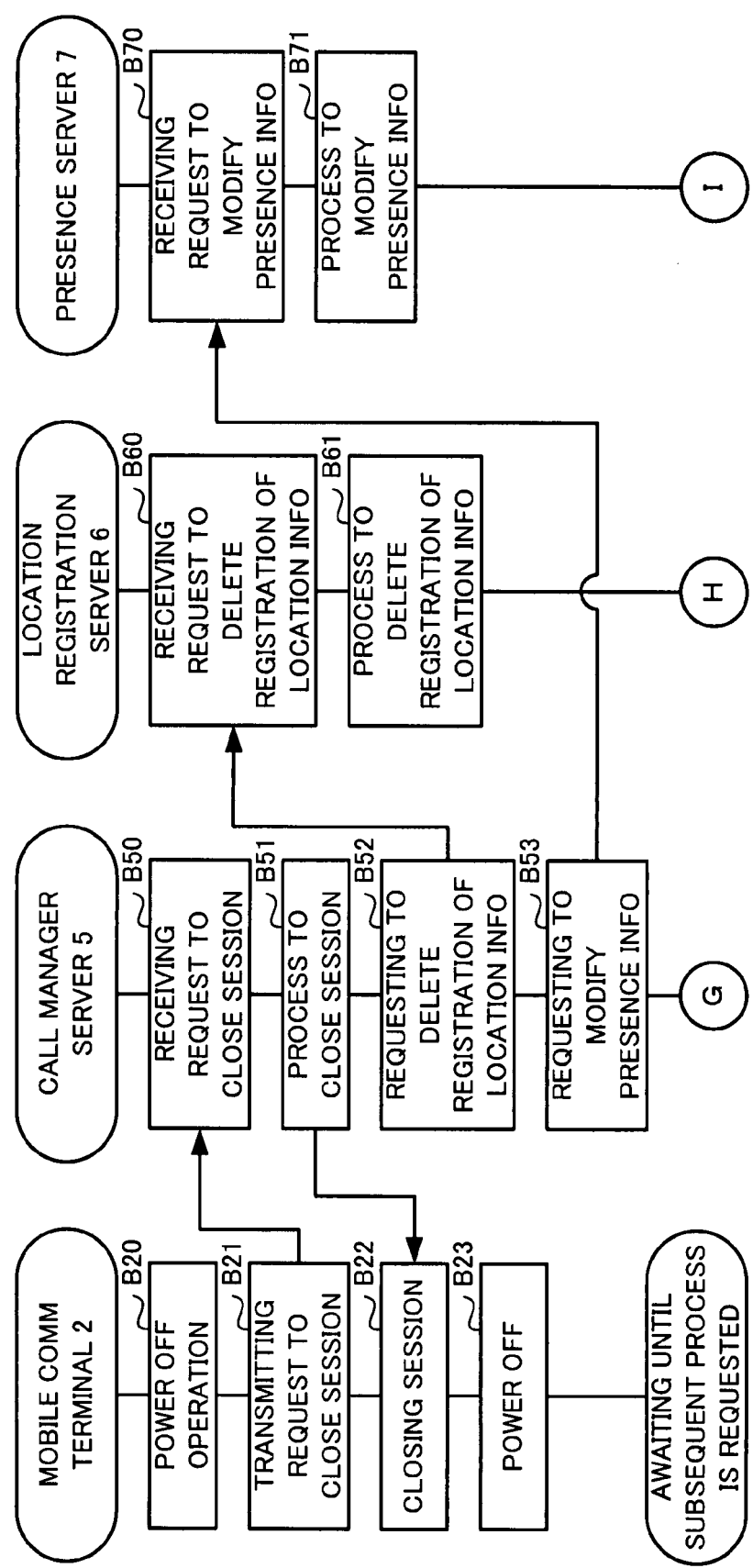
FIGS. 5A, 5B, and 5C represent a flowchart indicating an operation related to each element constituting a presence communication system, when a mobile communication terminal turns a second wireless communication unit from an off-state into an on-state, in embodiment 1 of the present invention.
Figure 5B:
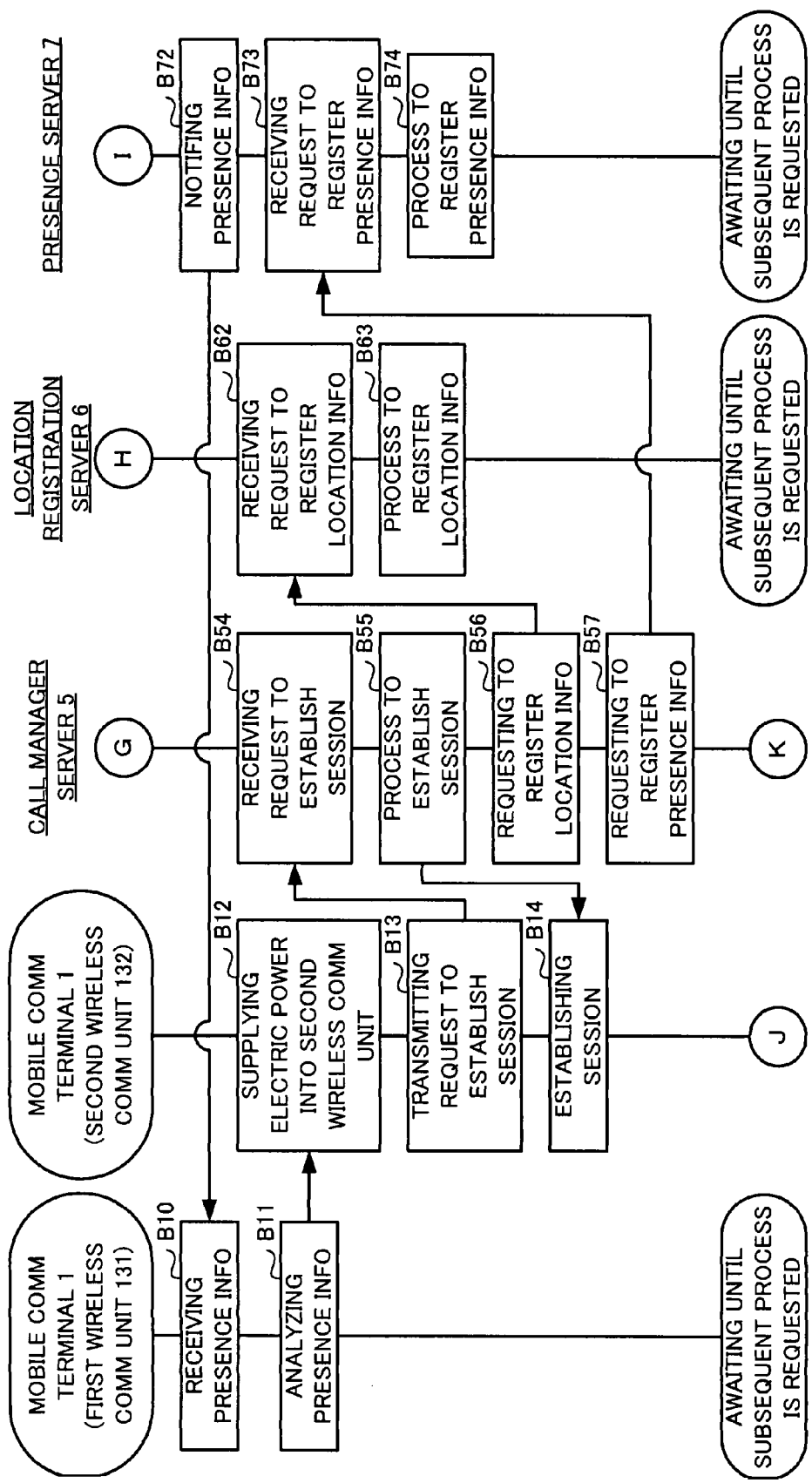
Figure 5C:
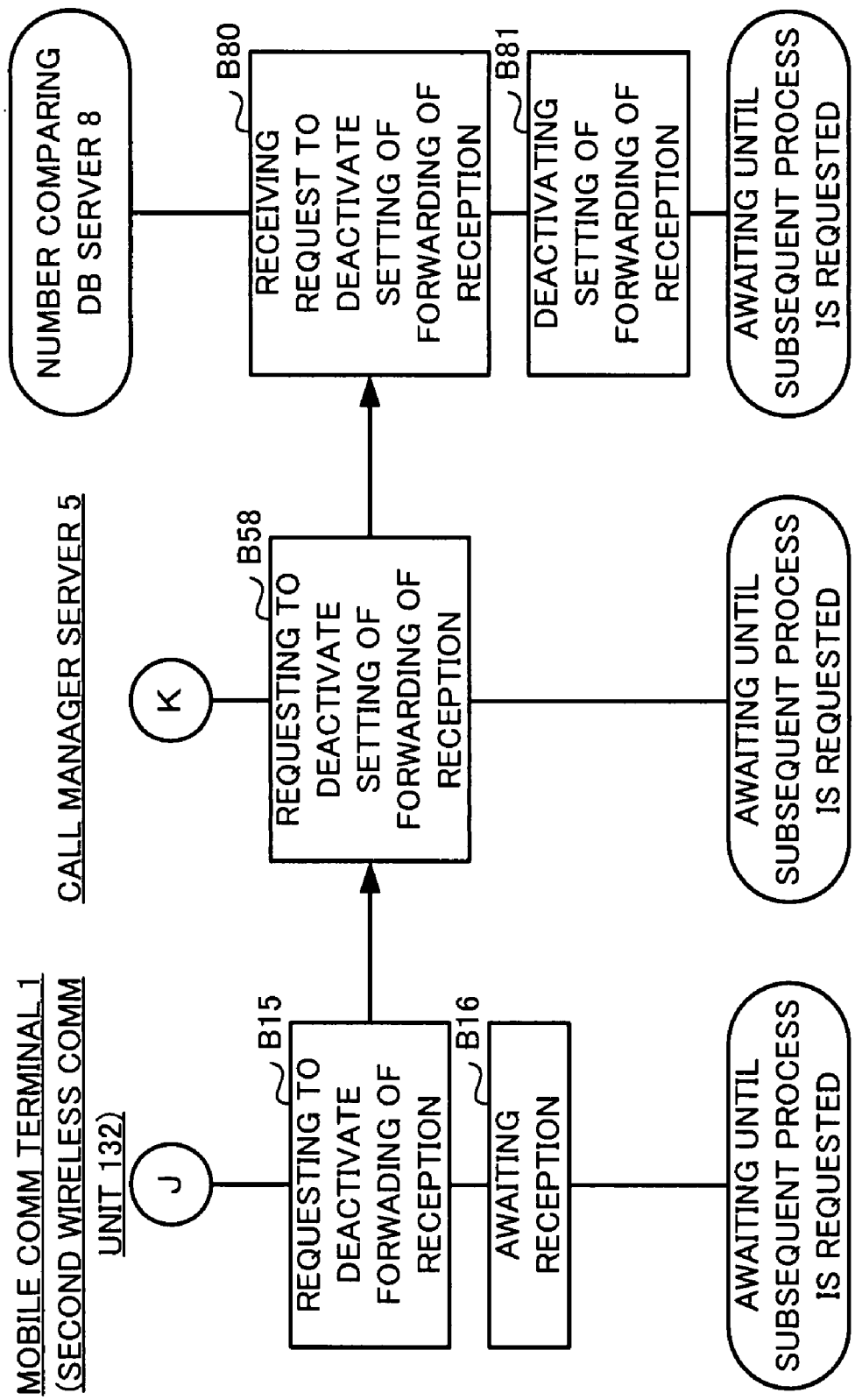

Next, the details concerning an operation of each constituent element provided at the presence communication system PS, when the mobile communication terminal 1 controls the state of the second wireless communication unit 132 from "OFF" to "ON", are to be explained, with reference to the flowcharts found in FIGS. 5A to 5C.

However, an operation state concerning the mobile communication terminal 1 and the mobile communication terminal 2 when initiating processes illustrated in the flowcharts found in FIGS. 5A to 5C is assumed to be a state which has completed processes illustrated in the flowcharts found in FIGS. 4A to 4C. In other words, the first wireless communication unit 131 is supplied with electric power while electric power supply into the second wireless communication unit 132 is being terminated.

Furthermore, the mobile communication terminal 2 is in an idle state because the power of the mobile communication terminal 2 is turned to ON.

In this state, when a user performs a power OFF operation provided for the mobile communication terminal 2 (step B20 found in FIG. 5A), processes illustrated in the flowcharts found in FIGS. 5A to 5C are initiated.

When a user performs a power OFF operation, the mobile communication terminal 2 transmits a request to close a session to the call manager server 5, via the second base station 4a (step B21). The call manager server 5 receives a request to close a session (step B50), and executes a process to close a session (step B51). This allows a session being established in between the mobile communication terminal 2 and the call manager server 5, to be closed (step B22). When the session is closed, the mobile communication terminal 2 turns the power to OFF (step B23), and awaits until the subsequent process is requested. Specifically, the mobile communication terminal 2 terminates electric power supply into a wireless communication unit, and awaits until a power ON operation is performed.

Furthermore, the mobile communication terminal 2 requests the location registration server 6 to delete the registration of location information via the call manager server 5 when a request to close a session is transmitted, and requests the presence server 7 to modify presence information. In order to perform this process, the call manager server 5 requests the location registration server 6 to delete a registration of location information concerning the mobile communication terminal 2 (step B52), and requests the presence server 7 to modify presence information concerning the mobile communication terminal 2 (step B53).

The location registration server 6 receives a request to delete the registration of location information (step B60), and executes a process to delete the registration of location information (step B61). The presence server 7 receives a request to modify presence information (step B70), and executes a process to modify the presence information (step B71). This allows the presence server 7 to recognize that the mobile communication terminal 2 is transited into an offline state.

The presence server 7 notifies the first wireless communication unit 131 provided at the mobile communication apparatus 1 of presence information indicating that the mobile communication terminal 2 is transited into an offline state, via the call manager server 5 and the first wireless communication system 3 (step B72 found in FIG. 5B).

The first wireless communication unit 131 is notified of presence information because the presence server 7 receives a request to register presence information concerning the first wireless communication unit 131 provided at the mobile communication terminal 1 from the call manager server 5 when establishing a session in between the first wireless communication unit 131 and the call manager server 5, and recognizes that the first wireless communication unit 131 provided at the mobile communication apparatus 1 is in an online (valid) state.

Here, when the first wireless communication unit 131 being notified of presence information is in a discontinuous idle state which indicates that a traffic channel is disconnected in an idle state, the presence information notifying apparatus 3b may, for example, utilize an SMS (Short Message Service) or the like when notifying that the presence information is in existence.

The first wireless communication unit 131 provided at the mobile communication terminal 1 receives presence information indicating that the mobile communication terminal 2, which is registered in the presence monitoring target information, is in an offline state (step B10).

The mobile communication terminal 1 analyzes the received presence information (step B11). As a result of the analysis, the mobile communication terminal 1 recognizes that the mobile communication terminal 2 which communicates via the second wireless communication system 4, as in the second wireless communication unit 132, is in an offline state. The mobile communication terminal 1 consequently causes a communication function provided for the second wireless communication unit 132 to operate, thereby, supplying electric power into the second wireless communication unit 132 (step B12).

Furthermore, the details concerning processes found in steps B11 and B12 are to be hereinafter explained with reference to the flowchart found in FIG. 6.

The second wireless communication unit 132 transmits a request to establish a session to the call manager server 5 via the second base station 4a (step B13). The call manager server 5 receives a request to establish a session (step B54), and executes a process to establish a session (step B55). This allows a session to be established in between the second wireless communication unit 132 and the call manager server 5 (step B14).

Furthermore, the second wireless communication unit 132 requests the location registration server 6 to register location information via the call manager server 5 when a request to establish a session is transmitted, and requests the presence server 7 to register presence information. In order to perform this process, the call manager server 5 requests the location registration server 6 to register location information concerning the second wireless communication unit 132 (step B56), and requests the presence server 7 to register presence information concerning the second wireless communication unit 132 (step B57).

The location registration server 6 receives a request to register location information (step B62), and executes a process to register location information concerning the second wireless communication unit 132 provided at the mobile communication terminal 1 (step B63).

The presence server 7 recognizes that the second wireless communication unit 132 provided at the mobile communication terminal 1 is in an online (valid) state, by a request from the call manager server 5 in step B57. The presence server 7 receives a request to register presence information (step B73), and executes a process to register presence information concerning the second wireless communication unit 132 provided at the mobile communication terminal 1 (step B74).

The mobile communication terminal 1 requests the call manager server 5 to deactivate forwarding of reception which is set at the number comparing DB server 8 and indicates that a reception addressed to the second wireless communication unit 132 is forwarded to the mobile communication terminal 2 (step B15 found in FIG. 5C). The call manager server 5 requests the number comparing DB server 8 to deactivate the setting of forwarding of reception (step B58).

The number comparing DB server 8 receives a request to deactivate the setting of forwarding of reception (step B80), and deactivates the setting of forwarding of reception (step B81).

In this way, the mobile communication terminal 1 causes the second wireless communication unit 132, which is normally to receive a reception, to operate when the power of the mobile communication terminal 2, which receives data addressed to the second wireless communication unit 132, is turned to OFF while the second wireless communication unit 132 is in an power OFF state, and the setting employed for forwarding of reception, which adopts the mobile communication terminal 2 as a forwarding destination, is deactivated.

The second wireless communication unit 132 is transited into an idle state once requesting to deactivate forwarding of reception (step B16), and awaits until the subsequent process is requested.

Furthermore, the details concerning processes described in steps B11, B12, and B15, all of which illustrated in the flowcharts found in FIGS. 5A to 5C, is to be explained with reference to the flowchart found in FIG. 6. The flowchart found in FIG. 6 not only includes processes described in steps B11, B12, and B15, all of which are found in figures 5A to 5C, but includes processes described in steps A16 to A18, all of which are found in FIGS. 4A to 4C as well.

Furthermore, the mobile communication terminal 2 is picked up, in FIGS. 4A to 4C and in FIGS. 5A to 5C, to exemplify the monitoring electronic apparatus for controlling electric power supply into the second wireless communication unit 132. However, the monitoring electronic apparatus needs only to be an electronic apparatus which is communicable via the second wireless communication system 4 being listed as the presence monitoring target information as an example in FIG. 3. Furthermore, in case of a plurality of electronic apparatuses concurrently being monitored, turning any one of electronic apparatuses as monitoring targets into an online state results in terminating electric power supply into the second wireless communication unit 132 as being illustrated in FIGS. 5A to 5C. Furthermore, turning all of the electronic apparatuses as monitoring targets into an offline state results in supplying electric power into the second wireless communication unit 132 as being illustrated in FIGS. 5A to 5C.

Figure 6:
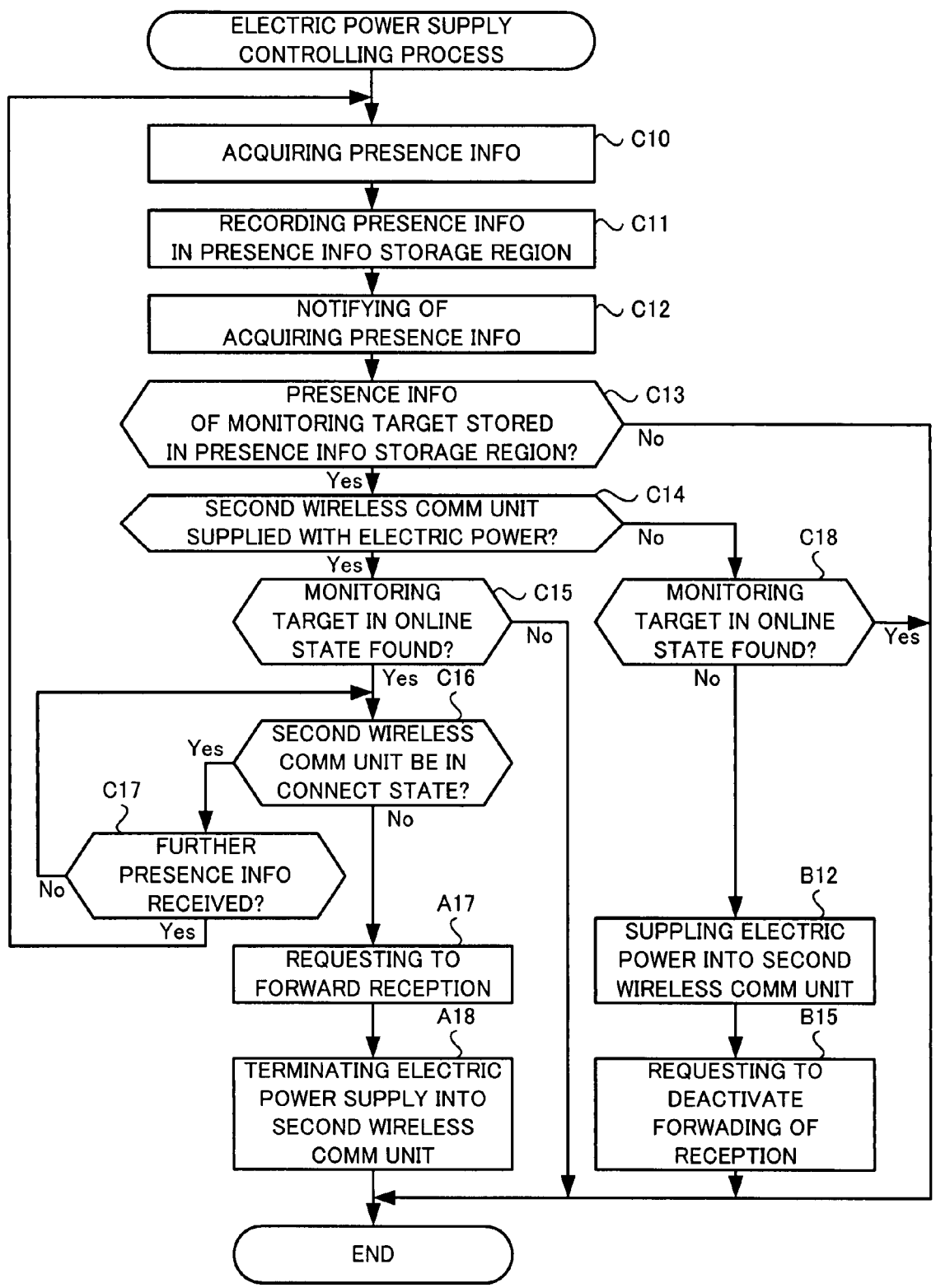
FIG. 6 represents a flowchart indicating a detailed operation related to a mobile communication terminal when controlling power supply into a wireless communication unit in embodiment 1 of the present invention.

The electric power supply controlling process illustrated in the flowchart found in FIG. 6 is initiated by receiving presence information from the presence server 7, via the first wireless communication system 3 or via the second wireless communication system 4, by the first wireless communication unit 131 or by the second wireless communication unit 132 each of which provided at the mobile communication terminal 1.

In other words, the electric power supply controlling process is initiated when the mobile communication terminal 1 receives presence information in step A15 illustrated in FIG. 4C or in step B10 illustrated in FIG. 5B. The processes described in steps C10 to C18 to be hereinafter illustrated in FIG. 6 also correspond to processes described in step A16 illustrated in FIG. 4C and in step B11 illustrated in FIG. 5B.

When one of the first wireless communication unit 131 and the second wireless communication unit 132 receives presence information, the presence information acquisition controlling unit 112a acquires the received presence information from one of the first wireless communication unit 131 and the second wireless communication unit 132 (step C10), and records the acquired presence information in the presence information storage region 121 (step C11).

The presence information acquisition controlling unit 112a subsequently notifies the presence specifying unit 112b of acquiring the presence information (step C12).

The presence specifying unit 112b determines as to whether presence information of a monitoring target is stored in the presence information storage region 121, with reference to the presence monitoring target information stored in the presence monitoring target information storage region 122 (step C13). For example, the presence specifying unit 112b determines as to whether an apparatus identifier AI provided for a monitoring target (alternate electronic apparatus) indicated by the presence monitoring target information illustrated in FIG. 3B is included within an apparatus identifier AI stored in the presence information storage region 121. If no presence information of a monitoring target is stored in the presence information storage region 121 (step C13; No), the controlling unit 11 terminates the electric power supply controlling process and awaits until the subsequent presence information is received.

If presence information of a monitoring target is stored in the presence information storage region 121 (step C13; Yes), the electric power supply determining unit 112c determines as to whether the second wireless communication unit 132 is supplied with electric power, with reference to the electric power supply state storage region 123 (step C14).

When the second wireless communication unit 132 is supplied with electric power and the second wireless communication unit 132 is in an operation (step C14; Yes), the electric power supply determining unit 112c determines as to whether a monitoring target in an online state is in existence, with reference to presence information of the monitoring target within the presence information storage region 121 (step C15). For example, the electric power supply determining unit 112c determines as to whether even one monitoring target whose presence PR is "online" is in existence, when presence information of a plurality of monitoring targets is included in the presence information storage region 121.

If no monitoring target in an online state is found (step C15; No), the controlling unit 11 terminates the electric power supply controlling process, and awaits until the subsequent presence information is received.

If even one monitoring target in an online state is found (step C15; Yes), the electric power supply determining unit 112c further determines as to whether communication state of the second wireless communication unit 132 is "connect state", with reference to the communication state storage region 124 (step C16).

When the second wireless communication unit 132 is in connect state (step C16; Yes), the electric power supply determining unit 112c determines as to whether one of the first wireless communication unit 131 and the second wireless communication unit 132 received further presence information (step C17).

If the further presence information is not received (step C17; No), the controlling unit 11 moves a process to step C16, and the electric power supply determining unit 112c waits until communication state of the second wireless communication unit 132 is turned into a non connect state. If the further presence information is received (step C17; Yes), the controlling unit 11 moves a process to step C10, and the electric power supply controlling unit 112 initiates the electric power supply controlling process from the start based on the further presence information.

When the second wireless communication unit 132 is not in connect state (step C16; No), the forwarding control unit 112d requests the call manager server 5 to forward a reception, in order to forward, to a monitoring target in an online state, data transmitted to the second wireless communication unit 132 from other electronic apparatuses (step A17). For example, when a plurality of monitoring targets in an online state are in existence, the forwarding control unit 112d requests the call manager server 5 to forward a reception, in order to forward a reception to any one of the targets.

Once the forwarding control unit 112d requests the call manager server 5 to forward a reception, the electric power supply determining unit 112c terminates electric power supply into the second wireless communication unit 132 (step A18). This allows the second wireless communication unit 132 to be in a power OFF state, until subsequently being supplied with electric power and being activated.

On the other hand, even though it is determined that the second wireless communication unit 132 is not supplied with electric power and the second wireless communication unit 132 is not in an operation in step C14 (step C14; No), the electric power supply determining unit 112c determines as to whether a monitoring target in an online state is in existence, with reference to the presence information of the monitoring target within the presence information storage region 121 (step C18) as in step C15.

If even one monitoring target in an online state is found (step C18; Yes), the second wireless communication unit 132 needs not to be operated. Therefore, the controlling unit 11 terminates the electric power supply controlling process, and awaits until the subsequent presence information is received.

If no monitoring target in an online state is found (step C18; No), a monitoring target does not receive data forwarded from the second wireless communication unit 132. Therefore, the second wireless communication unit 132 needs to be operated so as to be received at the second wireless communication unit 132.

At the moment, the electric power supply determining unit 112c outputs an instruction signal which instructs the power source controller 15a to supply electric power into the second wireless communication unit 132, thereby, initiating electric power supply into the second wireless communication unit 132. The power source controller 15a receives an instruction signal, and supplies electric power into the second wireless communication unit 132 with controlling the battery 15b (step B12).

The forwarding control unit 112d requests the call manager server 5 to deactivate forwarding of reception which is set in the number comparing DB server 8 and indicates that a reception addressed to the second wireless communication unit 132 is forwarded to the mobile communication terminal 2 (step B15).

The mobile communication terminal 1 awaits until the subsequent presence information is received.

Here, whether or not a reception state of the wireless signal by the first wireless communication unit 131 is favorable may further be determined in step C16. In case that a reception state of the first wireless communication unit 131 is unfavorable, a reception of presence information by the first wireless communication unit 131 cannot be done, after the second wireless communication unit 132 is transited into a power OFF state. In this case, when a communication state of the first wireless communication unit 131 is determined to be unfavorable, the electric power supply determining unit 112c only needs not to terminate electric power supply into the second wireless communication unit 132, until a communication state of the first wireless communication unit 131 is turned to be favorable.

Furthermore, when executing a process described in step C16, even though a reception state of the wireless signal by the first wireless communication unit 131 is favorable, a reception state of the wireless signal by the first wireless communication unit 131 may be turned to be unfavorable after the second wireless communication unit 132 is transited into a power OFF state. In order to solve this problem, when a communication state of the first wireless communication unit 131 is determined to be unfavorable, electric power supply into the second wireless communication unit 132 only needs to be immediately initiated. This allows the first wireless communication unit 131 and the second wireless communication unit 132 to avoid concurrently being in a state which unables reception of a wireless signal.

Furthermore, when the second wireless communication unit 132 is in a power OFF state, electric power supply into the second wireless communication unit 132 may be allowed to immediately be restarted when a user is in an attempt to communicate with the use of the second wireless communication unit 132.

At the moment, in order to detect initiation of communication with the use of the second wireless communication unit 132, for example, it is only required to detect an execution command concerning communication with the use of the second wireless communication unit 132 by a user from the operation unit 16 being input. Specifically, the operation unit 16 accepts an input of an instruction information for initiating communication by the second wireless communication unit 132, in response to an operation of a user. The electric power supply controlling unit 112 restarts electric power supply into the second wireless communication unit 132, when the instruction information is input through the operation unit 16 after electric power supply into the second wireless communication unit 132 is terminated. Furthermore, in order to detect initiation of communication with the use of the second wireless communication unit 132, the storing unit 12 may be required to be store an application in association with the second wireless communication unit 132 and activation of the application by the user may be detected. This allows the user to communicate with the use of the second wireless communication unit 132, when being desired.

As being explained above, the mobile communication terminal 1 according to embodiment 1 is comprised of the first wireless communication unit 131 which communicates via the first wireless communication system 3 and the second wireless communication unit 132 which communicates via the second wireless communication system 4. The mobile communication terminal 1 adopts an electronic apparatus (alternate, electronic apparatus) communicating via the second wireless communication system 4, in place of the second wireless communication unit 132, as a monitoring target. The presence information acquisition controlling unit 112a acquires presence information indicating a communication state of a monitoring target from the presence server 7. The electric power supply determining unit 112c determines as to whether the monitoring target is in a communicable online state, based on the acquired presence information. The electric power supply determining unit 112c suppresses electric power to be consumed by the second wireless communication unit 132, once the monitoring target is determined to be in an online state.

According to the mobile communication terminal 1 in embodiment 1, when the electronic apparatus being as a monitoring target is in an online state, the electronic apparatus is communicable in place of the second wireless communication unit 132. Accordingly, it is possible to suppress electric power to be consumed by the second wireless communication unit 132. Therefore, according to embodiment 1, it is possible to suppress electric power consumption of the mobile communication terminal 1 as a whole.

Furthermore, according to embodiment 1, when electric power consumed by the second wireless communication unit 132 is not suppressed, the presence information acquisition controlling unit 112a acquires presence information from the presence server 7 via any one of the first wireless communication system 3 and the second wireless communication system 4. On the other hand, when electric power consumed by the second wireless communication unit 132 is suppressed, the presence information acquisition controlling unit 112a acquires presence information from the presence server 7 via the first wireless communication system 3. Further, the electric power supply determining unit 112c deactivates suppressing electric power consumed by the second wireless communication unit 132, once the presence information acquisition controlling unit 112a acquires presence information indicating that the monitoring target is not in an online state while suppressing electric power consumed by the second wireless communication unit 132.

Accordingly, according to the mobile communication terminal 1 in embodiment 1, when a monitoring target is transited into a incommunicable state, electric power is consumed again by the second wireless communication unit 132, therefore, electric power consumption may be suppressed with having at least one of the monitoring target and the second wireless communication unit 132 being in a communicable state.

Furthermore, according to embodiment 1, the presence monitoring target information storage region 122 stores presence monitoring target information indicating an apparatus identifier AI being as a monitoring target. The presence information acquisition controlling unit 112a acquires an apparatus identifier AI for use in identifying an electronic apparatus on a communication network and a presence PR of an electronic apparatus being specified by the apparatus identifier in association with one another from the presence server 7, via any one of the first wireless communication system 3 and the second wireless communication system 4. The presence specifying unit 112b determines as to whether the apparatus identifier AI acquired by the presence information acquisition controlling unit 112a is stored in the presence monitoring target information storage region 122. The presence PR being in association with the apparatus identifier AI which is determined to be stored in the presence monitoring target information storage region 122 by the presence specifying unit 112b is adopted as presence information of a monitoring target.

Accordingly, according to the mobile communication terminal 1 in embodiment 1, presence information of a monitoring target can appropriately be acquired.

Furthermore, according to embodiment 1, the electric power supply determining unit 112c executes electric power supply into the second wireless communication unit 132, when a monitoring target is not in an online state. The electric power supply determining unit 112c also terminates electric power supply into the second wireless communication unit 132, when a monitoring target is in an online state.

Accordingly, according to the mobile communication terminal 1 in embodiment 1, electric power consumption by the mobile communication terminal 1 can be suppressed by controlling electric power supply into the second wireless communication unit 132.

Furthermore, according to embodiment 1, the first wireless communication unit 131 represents a wide-area wireless communication unit which communicates via a base station of the first wireless communication system 3 being as a wide-area wireless communication network. The second wireless communication unit 132 represents a local wireless communication unit which communicates via a base station of the second wireless communication system 4 being as a local wireless communication network. The local wireless communication network has a base station with a more restricted reachable area of an electric wave than a base station of the wide-area wireless communication network.

Accordingly, according to the mobile communication terminal 1 in embodiment 1, electric power consumed by the local wireless communication unit can be suppressed.

Furthermore, according to embodiment 1, when the electric power supply determining unit 112c determines that a monitoring target is in an online state, the forwarding control unit 112d transmits a request to forward a reception, to the number comparing DB server 8 being as a forwarding server via the call manager server 5. The request is to forward information to be transmitted to the second wireless communication unit 132 via the second wireless communication system 4, to the monitoring target.

Accordingly, according to embodiment 1, forwarding is automatically executed by the call manager server 5 which refers to the number comparing DB server 8. Therefore, the transmitter can communicate without searching for an electronic apparatus which communicates in place of the second wireless communication unit 132.

Embodiment 2

Figure 7:
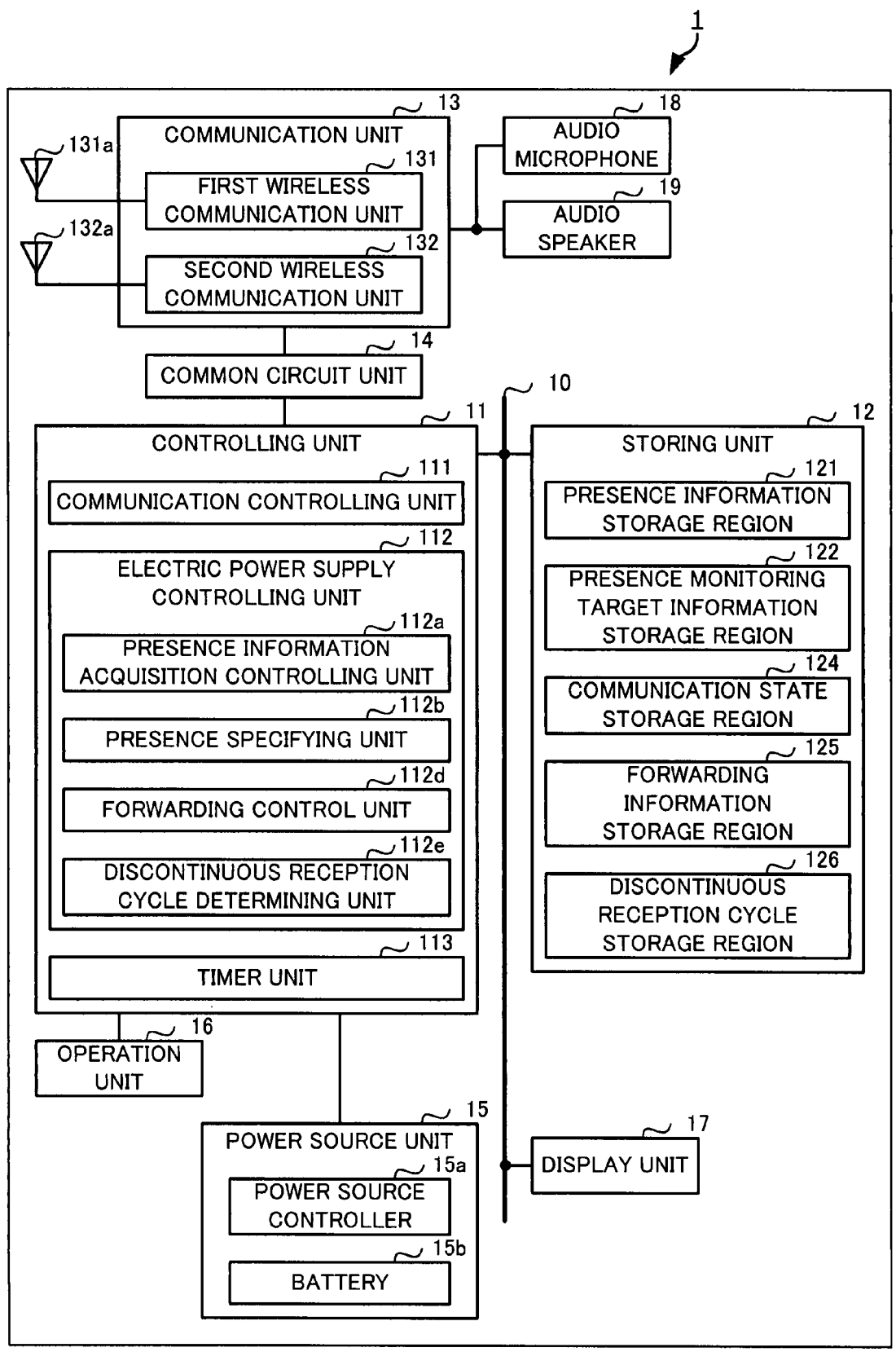
FIG. 7 represents a block diagram illustrating a circuit configuration of a mobile communication terminal according to embodiment 2 of the present invention.
Figure 8:
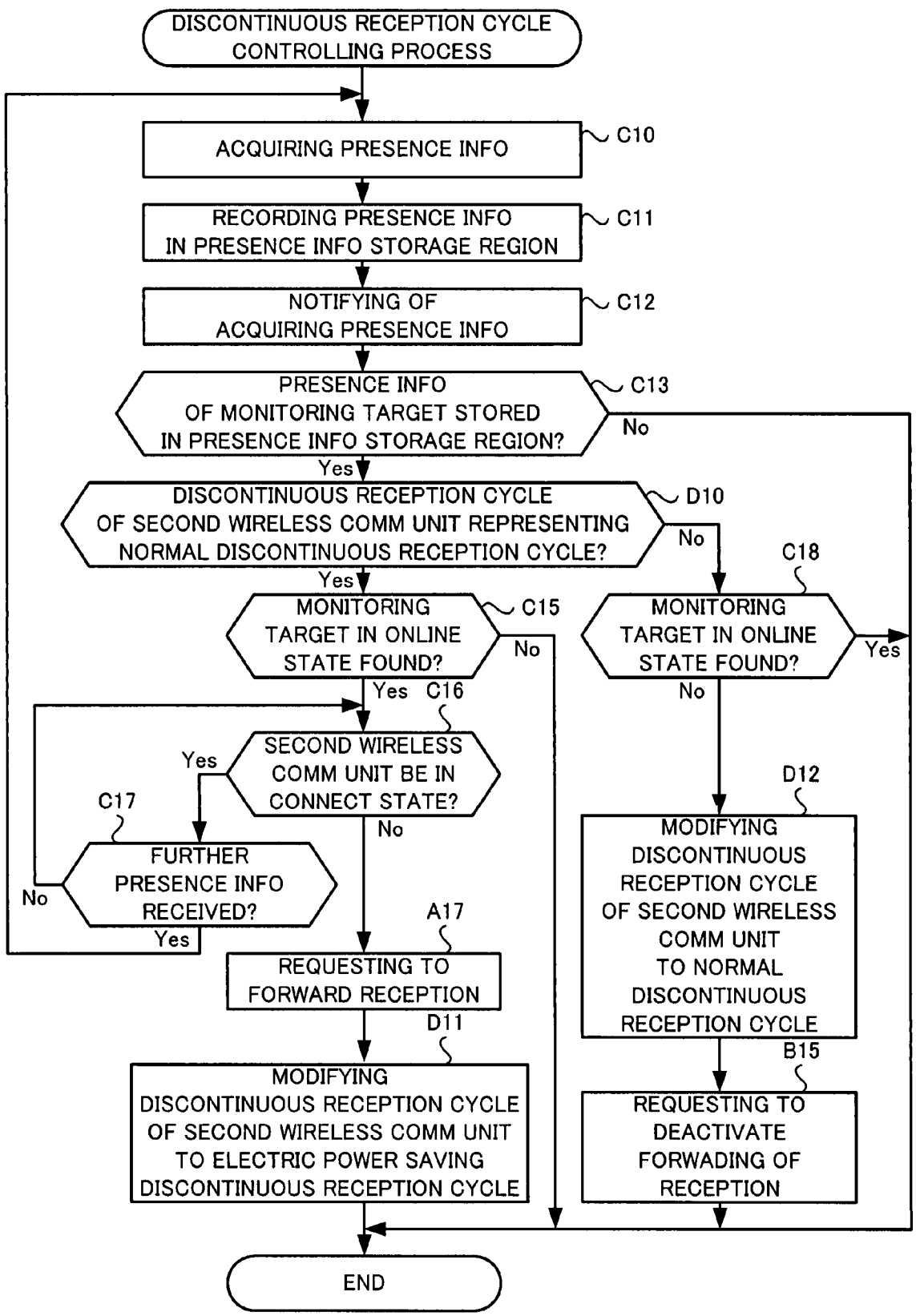
FIG. 8 represents a flowchart indicating a detailed operation related to a mobile communication terminal when controlling a discontinuous reception cycle in embodiment 2 of the present invention.

Next, an explanation according to embodiment 2 of the present invention is to be given with reference to FIGS. 1, 7, and 8.

Embodiment 2 exemplifies reduction of dissipating electric power stored in the battery 15b for use in being supplied into the first wireless communication unit 131 and into the second wireless communication unit 132 for use in an operation, with modifying a discontinuous reception cycle indicating a cycle of a timing at which a communication function provided for a wireless communication unit operates in idle state. Further, in FIGS. 7 and 8, the equivalent reference numeral is given for a constituent element which is equivalent to the constituent element indicated in FIGS. 2 and 6.

First of all, an explanation concerning the circuit configuration regarding the mobile communication terminal 1 according to embodiment 2 is to be given with reference to FIG. 7.

The controlling unit 11 described by embodiment 2 is provided with a discontinuous reception cycle determining unit 112e and a timer unit 113.

The discontinuous reception cycle determining unit 112e sets a discontinuous reception cycle indicating a cycle in which communication functions provided at the first wireless communication unit 131 and the second wireless communication unit 132 intermittently operate, with reference to the results determined by the presence specifying unit 112b, discontinuous reception cycle information stored in the storing unit 12, and a communication state concerning the communication unit 13 within the communication state storage region 124. Furthermore, the discontinuous reception cycle determining unit 112e causes the discontinuous reception cycle storage region 126 to store the set discontinuous reception cycle.

Here, an discontinuous reception cycle represents a predetermined time cycle which indicates a cycle of a timing at which electric power is supplied into the first wireless communication unit 131 and into the second wireless communication unit 132 from the battery 15b in order to operate communication functions provided at the first wireless communication unit 131 and at the second wireless communication unit 132.

A discontinuous reception cycle is set so as to synchronize a time slot TS defined by wireless signals received by the first wireless communication unit 131 and by the second wireless communication unit 132 in an idle state. The wireless signals include information to be received for each time cycle of the time slot TS.

The timer unit 113 detects that an elapsed time reached the discontinuous reception cycle by timing the elapsed time from the completion time concerning an immediately preceding reception process being performed.

The discontinuous reception cycle storage region 126 described by embodiment 2 stores a normal discontinuous reception cycle T1 and a predetermined electric power saving discontinuous reception cycle T2 which is set so as to having a larger value than the normal discontinuous reception cycle T1.

Furthermore, the discontinuous reception cycle storage region 126 stores a first reception cycle flag F1 which indicates as to which one of the normal discontinuous reception cycle T1 and the electric power saving discontinuous reception cycle T2 is presently employed as the basis of an operation caused by the first wireless communication unit 131, and a second reception cycle flag F2 which indicates as to which one of the normal discontinuous reception cycle T1 and the electric power saving discontinuous reception cycle T2 is presently employed as the basis of an operation caused by the second wireless communication unit 132.

The communication controlling unit 111 controls communication caused by the first wireless communication unit 131 and by the second wireless communication unit 132, with reference to the first reception cycle flag F1 and to the second reception cycle flag F2, based on the discontinuous reception cycles indicated by the first reception cycle flag F1 and by the second reception cycle flag F2.

Furthermore, the power source controller 15a continues/terminates electric power supply into the first wireless communication unit 131 and into the second wireless communication unit 132, based on the discontinuous reception cycle stored in the discontinuous reception cycle storage region 126.

Next, an explanation concerning a discontinuous reception cycle controlling process in which electric power supply controlling unit 112, illustrated in FIG. 7, controls a discontinuous reception cycle of the second wireless communication unit 132 based on presence information received by the mobile communication terminal 1 is given with reference to the flowchart found in FIG. 8.

The discontinuous reception cycle controlling process described in the flowchart illustrated in FIG. 8 is initiated by receiving presence information from the presence server 7, via one of the first wireless communication system 3 and the second wireless communication system 4, by one of the first wireless communication unit 131 and the second wireless communication unit 132 each of which provided at the mobile communication terminal 1.

When one of the first wireless communication unit 131 and the second wireless communication unit 132 receives the presence information, the presence information acquisition controlling unit 112a acquires the received presence information from one of the first wireless communication unit 131 and the second wireless communication unit 132 (step C10), and records the acquired presence information in the presence information storage region 121 (step C11).

The presence information acquisition controlling unit 112a subsequently notifies the presence specifying unit 112b of acquiring presence information (step C12).

The presence specifying unit 112b determines as to whether presence information of a monitoring target is stored in the presence information storage region 121, with reference to the presence monitoring target information stored in the presence monitoring target information storage region 122 (step C13). If no presence information of a monitoring target is stored in the presence information storage region 121 (step C13; No), the controlling unit 11 terminates the discontinuous reception cycle controlling process and awaits until the subsequent presence information is received.

If presence information of a monitoring target is stored in the presence information storage region 121 (step C13; Yes), the discontinuous reception cycle determining unit 112e determines as to whether an discontinuous reception cycle operating a communication function provided for the second wireless communication unit 132 represents a normal discontinuous reception cycle T1 or an electric power saving discontinuous reception cycle T2, with reference to a second reception cycle flag F2 stored in the discontinuous reception cycle storage region 126 (step D10).

When the second wireless communication unit 132 is being operated based on the normal discontinuous reception cycle T1 (step D10; Yes), the discontinuous reception cycle determining unit 112e determines as to whether a monitoring target in an online state is in existence, with reference to presence information of the monitoring target within the presence information storage region 121 (step C15).

If no monitoring target in an online state is found (step C15; No), the controlling unit 11 terminates the discontinuous reception cycle controlling process, and awaits until the subsequent presence information is received.

If even one monitoring target in an online state is found (step C15; Yes), the discontinuous reception cycle determining unit 112e further determines as to whether communication state of the second wireless communication unit 132 is "connect state", with reference to the communication state storage region 124 (step C16):

When the second wireless communication unit 132 is in connect state (step C16; Yes), the discontinuous reception cycle determining unit 112e determines as to whether one of the first wireless communication unit 131 and the second wireless communication unit 132 received further presence information (step C17).

If the further presence information is not received (step C17; No), the controlling unit 11 moves the process to step C16, and the discontinuous reception cycle determining unit 112e waits until communication state of the second wireless communication unit 132 is turned into a non connect state. If the further presence information is received (step C17; Yes), the controlling unit 11 moves the process to step C10, and the electric power supply controlling unit 112 initiates the discontinuous reception cycle controlling process from the start, based on the further presence information.

When the second wireless communication unit 132 is not in connect state (step C16; No), the forwarding control unit 112d requests the call manager server 5 to forward a reception, in order to forward, to a monitoring target in an online state, data transmitted to the second wireless communication unit 132 from other electronic apparatuses (step A17).

Once the forwarding control unit 112d requests the call manager server 5 to forward a reception, in order to lengthen the discontinuous reception cycle for communication by the second wireless communication unit 132, the discontinuous reception cycle determining unit 112e modifies (rewrites) the contents indicated by the second reception cycle flag F2 to the electric power saving discontinuous reception cycle T2 (step D11). The communication controlling unit 111 operates the second wireless communication unit 132 in the electric power saving discontinuous reception cycle T2, with reference to the modified second reception cycle flag F2.

On the other hand, even though it is determined that the second wireless communication unit 132 being operated based on the electric power saving discontinuous reception cycle T2 in step D10 (step D10; No), the discontinuous reception cycle determining unit 112e determines as to whether a monitoring target in an online state is in existence, with reference to the presence information of the monitoring target within the presence information storage region 121 (step C18), as in step C15.

If even one monitoring target in an online state is found (step C18; Yes), the controlling unit 11 terminates the discontinuous reception cycle controlling process in consideration of lacking necessity which requires the second wireless communication unit 132 to be operated in the normal discontinuous reception cycle T1, and awaits until the subsequent presence information is received.

If no monitoring target in an online state is found (step C18; No), a monitoring target does not receive data forwarded from the second wireless communication unit 132. Therefore, the discontinuous reception cycle determining unit 112e operates the second wireless communication unit 132 based on the normal discontinuous reception cycle T1 in order to ensure reception by the second wireless communication unit 132.

In order to shorten a discontinuous reception cycle for communication by the second wireless communication unit 132, therefore, the discontinuous reception cycle determining unit 112e modifies (rewrites) the contents indicated by the second reception cycle flag F2 to the normal discontinuous reception cycle T1 (step D12). The communication controlling unit 111 operates the second wireless communication unit 132 in the normal discontinuous reception cycle T1, with reference to the modified second reception cycle flag F2.

The forwarding control unit 112d requests the call manager server 5 to deactivate forwarding of reception which is set in the number comparing DB server 8 and indicates that a reception addressed to the second wireless communication unit 132 is forwarded to the mobile communication terminal 2 (step B15).

The mobile communication terminal 1 awaits unit the subsequent presence information is received.

As being described above, when the monitoring target is not in an online state, the discontinuous reception cycle determining unit 112e provided at the mobile communication terminal 1 according to embodiment 2 sets an discontinuous reception cycle of the second wireless communication unit 132 to a normal discontinuous reception cycle T1 being as a standard cycle. Furthermore, when the monitoring target is in an online state, the discontinuous reception cycle determining unit 112e sets a discontinuous reception cycle of the second wireless communication unit 132 to an electric power saving discontinuous reception cycle T2 having a cycle being longer than the standard cycle. When the second wireless communication unit 132 is being operated in an electric power saving discontinuous reception cycle T2, consumed electric power is reduced compared with an operation in the normal discontinuous reception cycle T1.

Accordingly, according to the mobile communication terminal 1 in embodiment 2, electric power consumption by the mobile communication terminal 1 can be suppressed by controlling the discontinuous reception cycle of the second wireless communication unit 132.

Furthermore, while embodiment 2 assumes a predetermined fixed value as a normal discontinuous reception cycle T1 and an electric power saving discontinuous reception cycle T2, a user may change the values. In this case, a user may increase a value of the electric power saving discontinuous reception cycle T2 when further desiring reduction of electric power consumption.

Furthermore, when both timeliness and speed of communication, rather than electric power dissipation of the battery 15b, are prioritized, a value of the electric power saving discontinuous reception cycle T2 may be decreased.

In this case, the operation unit 16 accepts an input of modification information for modifying the electric power saving discontinuous reception cycle T2, in response to an operation of a user. Based on the modification information concerning the electric power saving discontinuous reception cycle T2 input through the operation unit 16, by a user's operation, the controlling unit 11 modifies a value of the electric power saving discontinuous reception cycle T2 stored in the discontinuous reception cycle storage region 126. The discontinuous reception cycle determining unit 112e executes a discontinuous reception cycle controlling process illustrated in FIG. 8; with the use of the modified electric power saving discontinuous reception cycle T2 stored in the discontinuous reception cycle storage region 126.

Furthermore, while embodiment 2 assumes the second wireless communication unit 132 as a target which modifies a discontinuous reception cycle in order to reduce electric power consumption, a wireless communication unit which modifies a discontinuous reception cycle may be changeable by the operation of the operation unit 16 by a user. In this case, in order to reduce electric power consumption, the mobile communication terminal 1 controls a discontinuous reception cycle of the wireless communication unit chosen by the user among a plurality of wireless communication units. Specifically, the operation unit 16 accepts an input of chosen information for specifying the first wireless communication unit 131 or the second wireless communication unit 132, in response to an operation of a user. The electric power supply controlling unit 112 suppresses electric power to be consumed by the wireless communication unit specified by the chosen information being input through the operation unit 16.

This allows a user to choose a wireless communication unit which modifies a discontinuous reception cycle, depending on utilization status, utilization frequency, and others, of the wireless communication unit.

Furthermore, an option may be given in such a way that a user may decide as to whether an operation for use in reducing electric power consumption provided for the wireless communication unit is to be executed. In this case, the operation unit 16 accepts an input of instruction information for initiating communication by the second wireless communication unit 132, in response to an operation of a user. When a discontinuous reception cycle of the second wireless communication unit 132 is set in an electric power saving discontinuous reception cycle T2, the discontinuous reception cycle of the second wireless communication unit 132 is reset to a normal discontinuous reception cycle T1 once the instruction to initiate communication by the second wireless communication unit 132 is input in the operation unit 16 by a user's operation.

This allows assuredness of communication to be prioritized, when desiring to secure as much assuredness of communication as possible even in case of low electric power remaining in a battery.

The first wireless communication system 3 according to the embodiment of the present invention may employ a portable communication system with a cellular method such as a GSM (Global System Mobile Communications). The second wireless communication system 4 may also employ a local wireless communication system such as a UWB (Ultra Wide Band) by way of example.

According to a presence communication system PS in accordance with the embodiment of the present invention, for example, when a user having the mobile communication terminal 1 performs data communication with the use of the notebook personal computer in an outside location, electric power supply into the second wireless communication unit 132 can be terminated, by receiving data by the notebook personal computer in place of the second wireless communication unit 132 provided at the mobile communication terminal 1.

Furthermore, an electronic apparatus corresponding to an apparatus identifier AI registered in the presence monitoring target information needs only to be a communicable electronic apparatus with the use of data, and may also be an electronic wrist watch, a white good, an audio-visual equipment, and others, having a communication function, other than a PC, a PDA, a car navigation apparatus, and a television apparatus as being exemplified in FIG. 3B.

Furthermore, the mobile communication terminal 1 according to the above-mentioned embodiment can be achieved with the use of a computer having a plurality of communication units.

For example, an explanation concerning the mobile communication terminal 1 according to the above-mentioned embodiment is given with an assumption utilizing a predetermined operation program stored in the storing unit 12. However, an apparatus executing the above-mentioned process may be constituted by distributing a program executing the above-mentioned process operation being stored in computer-readable recording medium such as a flexible disk, a CD-ROM (Compact Disk Read-Only Memory), a DVD (Digital Versatile Disk), and an MO (Magneto-Optical disk) and by installing the program at a computer.

Furthermore, a program may be stored in a disk apparatus and others included in a predetermined server apparatus on a communication network such as the Internet, and may be allowed to be downloaded into a computer by superimposing on a carrier wave by way of example. Furthermore, the above-mentioned process can be achieved by activating/executing a program while being forwarded via a communication network.

Furthermore, in case of achieving the above-mentioned function with assigning tasks to OSs (Operating System) or in case of achieving with cooperating with OSs and applications, and in other cases, only portions other than OSs may be stored in medium to be distributed, and may be downloaded in a computer or the like.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications No. 2006-315481 filed on Nov. 22, 2006 and No. 2007-299802 filed on Nov. 19, 2007, and including specification, claims, drawings and summary. The disclosures of the above Japanese Patent Applications are incorporated herein by reference in their entireties.

What is claimed is:

1. An electronic apparatus which communicates via a plurality of communication networks including a first communication network and a second communication network being different from the first communication network, comprising:

a plurality of communication units including a first communication unit which communicates via the first communication network and a second communication unit which communicates via the second communication network;

a presence information acquiring unit which acquires presence information indicating a communication state of an alternate communication apparatus being as a communication apparatus which communicates via the second communication network in place of the second communication unit;

an online determining unit which determines as to whether the alternate communication apparatus is in an online state, based on the presence information acquired by the presence information acquiring unit; and a consumed electric power controlling unit which suppresses electric power to be consumed by the second communication unit, when the online determining unit determines that the alternate communication apparatus is in an online state.

2. The electronic apparatus according to claim 1, wherein:

the presence information acquiring unit acquires presence information of the alternate communication apparatus via at least one of plurality of the communication networks when the consumed electric power of the second communication unit is not suppressed, and acquires presence information of the alternate communication apparatus via at least one of communication networks other than the second communication network among a plurality of the communication networks when the consumed electric power of the second communication unit is suppressed by the consumed electric power controlling unit, and the consumed electric power controlling unit deactivates suppression of consumed electric power of the second communication unit, when the online determining unit determines that the alternate communication unit is not in an online state while suppressing consumed electric power of the second communication unit.

3. The electronic apparatus according to claim 1, further comprising
an alternate apparatus identifier storing unit which stores an apparatus identifier of the alternate communication apparatus, wherein
the presence information acquiring unit includes:
a communication apparatus information acquiring unit which acquires an apparatus identifier for identifying a communication apparatus and presence information of a communication apparatus specified by the apparatus identifier in association with one another, from a presence server managing a communication state of a communication apparatus on a communication network, via at least one of plurality of the communication networks;
an alternate determining unit which determines as to whether an apparatus identifier acquired by the communication apparatus information acquiring unit is stored in the alternate apparatus identifier storing unit; and
an alternate communication apparatus presence information acquiring unit which acquires, as presence information of the alternate communication apparatus, presence information acquired by the communication apparatus information acquiring unit in association with an apparatus identifier which is stored in the alternate apparatus identifier storing unit, when the alternate determining unit determines that the apparatus identifier is stored in the alternate apparatus identifier storing unit.

4. The electronic apparatus according to claim 1, wherein the consumed electric power controlling unit includes an electric power supply controlling unit which executes electric power supply into the second communication unit when the online determining unit determines that an alternate communication unit is not in an online state, and terminates electric power supply into the second communication unit when the online determining unit determines that an alternate communication apparatus is in an online state.

5. The electronic apparatus according to claim 4 further comprising
an operation unit which accepts an input of an instruction information for initiating communication by the second communication unit, in response to an operation of a user,
wherein the electric power supply controlling unit restarts electric power supply into the second communication unit, when instruction information is input through the operation unit after electric power supply into the second communication unit is terminated.

6. The electronic apparatus according to claim 1, wherein the consumed electric power controlling unit includes a discontinuous reception cycle controlling unit which sets a discontinuous reception cycle of the second communication unit to a predetermined standard cycle when the online determining unit determines that an alternate communication apparatus is not in an online state, and sets the discontinuous reception cycle to an electric power saving cycle having a cycle being longer than the predetermined standard cycle when the online determining unit determines that an alternate communication apparatus is in an online state.

7. The electronic apparatus according to claim 6, further comprising:

a discontinuous reception cycle storing unit which stores the electric power saving cycle;
an operation unit which accepts an input of modification information for modifying the electric power saving cycle, in response to an operation of a user; and
a discontinuous reception cycle modification unit which modifies an electric power saving cycle stored in the discontinuous reception cycle storing unit, based on the modification information being input through the operation unit,
wherein the discontinuous reception cycle controlling unit sets the discontinuous reception cycle to the electric power saving cycle stored in the discontinuous reception cycle storing unit, when the online determining unit determines that an alternate communication apparatus is in an online state.

8. The electronic apparatus according to claim 6, further comprising
an operation unit which accepts an input of instruction information for initiating communication by the second communication unit, in response to an operation of a user,
wherein the discontinuous reception cycle controlling unit resets the discontinuous reception cycle to the predetermined standard cycle, when instruction information is input through the operation unit after the discontinuous reception cycle is set to the electric power saving cycle.

9. The electronic apparatus according to claim 1, wherein
the first communication network is a wide-area wireless communication network,
the first communication unit is a wide-area wireless communication unit which communicates via a base station of the wide-area wireless communication network,
the second communication network is a local wireless communication network having a base station with a more restricted reachable area of an electric wave than a base station of the wide-area wireless communication network, and
the second communication unit is a local wireless communication unit which communicates via a base station of the local wireless communication network.

10. The electronic apparatus according to claim 1, further comprising
a forwarding request unit which transmits a forwarding request, to a forwarding server connected to the second communication network, for forwarding information to be transmitted to the second communication unit via the second communication network, to an alternate communication apparatus which is in an online state, when the online determining unit determines that the alternate communication apparatus is in an online state.

11. The electronic apparatus according to claim 1, further comprising
an operation unit which accepts an input of chosen information for specifying one communication unit being chosen among a plurality of the communication units, in response to an operation of a user,
wherein the consumed electric power controlling unit suppresses electric power to be consumed by the communication unit specified by the chosen information being input through the operation unit.

12. A presence communication system, comprising:
a presence server which manages a communication state of a communication apparatus; and
an electronic apparatus which communicates via a plurality of communication networks including a first communication network and a second communication network being different from the first communication network, wherein the presence server transmits presence information indicating a communication state of an alternate communication apparatus being as a communication apparatus which communicates via the second communication network in place of the second communication unit, to the electronic apparatus, and the electronic apparatus, comprises:

a plurality of communication units including a first communication unit which communicates via the first communication network and a second communication unit which communicates via the second communication network;

a presence information acquiring unit which acquires presence information of the alternate communication apparatus transmitted by the presence server, via at least one of a plurality of the communication networks;

an online determining unit which determines as to whether the alternate communication apparatus is in an online state, based on the presence information acquired by the presence information acquiring unit; and a consumed electric power controlling unit which suppresses electric power to be consumed by the second communication unit, when the online determining unit determines that the alternate communication apparatus is in an online state.

13. A non-transitory computer-readable recording medium storing a program which causes a computer, comprising a plurality of communication units including a first communication unit which communicates via a first communication network and a second communication unit which communicates via a second communication network being different from the first communication network, and communicating via a plurality of communication networks including the first communication network and the second communication network, to execute:

a presence information acquiring step of acquiring presence information indicating a communication state of an alternate communication apparatus being as a communication apparatus which communicates via the second communication network in place of the second communication unit;

an online determining step of determining as to whether the alternate communication apparatus is in an online state, based on the presence information acquired in the presence information acquiring step; and a consumed electric power controlling step which suppresses electric power to be consumed by the second communication unit, when it is determined that the alternate communication apparatus is in an online state in the online determining step.

* * * * *